(12) United States Patent
Van Wageningen et al.

(10) Patent No.: US 10,778,048 B2
(45) Date of Patent: *Sep. 15, 2020

(54) WIRELESS INDUCTIVE POWER TRANSFER

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 24 days.

This patent is subject to a terminal disclaimer.

(21) Appl. No.: 16/160,476

(22) Filed: Oct. 15, 2018

(65) Prior Publication Data

US 2019/0052128 A1 Feb. 14, 2019

Related U.S. Application Data

(63) Continuation of application No. 15/124,043, filed as application No. PCT/EP2015/054206 on Feb. 27, 2015, now Pat. No. 10,103,584.

(Continued)

(30) Foreign Application Priority Data

Mar. 25, 2014 (EP) .................................... 14161394

(51) Int. Cl.
*H02J 50/60* (2016.01)
*H02J 50/10* (2016.01)
(Continued)

(52) U.S. Cl.
CPC .............. *H02J 50/60* (2016.02); *H02J 50/10* (2016.02); *H02J 50/12* (2016.02); *H02J 50/90* (2016.02)

(58) Field of Classification Search
CPC .. H02J 5/005; H02J 7/025; H02J 50/90; H02J 50/12
See application file for complete search history.

(56) References Cited

U.S. PATENT DOCUMENTS 6,580,870 B1 6/2003 Kaknazawa
10,103,584 B2 * 10/2018 Van Wageningen .... H02J 5/005
(Continued)

FOREIGN PATENT DOCUMENTS

JP 2014007838 A 1/2014
WO 200063915 A1 10/2000
(Continued)

OTHER PUBLICATIONS

"System Description Wireless Power Transfer", vol. 1 Low Power, Part 1 Interface Definition, Version 1.0.1, Oct. 2010.
(Continued)

*Primary Examiner* — Jared Fureman
*Assistant Examiner* — Duc M Pham

(57) ABSTRACT

A wireless power transfer system includes a power transmitter (101) providing power to a power receiver (105) via an inductive power signal. The power transmitter (101) and receiver (105) can operate in different modes including a test mode and a power transfer mode. Operating parameters of the power receiver (105) are constrained in the test mode relative (and specifically the loading). A foreign object detector (209) generates a foreign object detection estimate from a comparison of a measured load to an expected load of the inductive power signal when the power receiver is operating in the test mode. A controller (211) enters the power transmitter (101) and receiver (103) into the power transfer mode when the foreign object detection estimate is indicative of no detection of a foreign object. In the power transfer mode, a parasitic power loss detector (207) gener- (Continued)

ates a parasitic power loss detection for the power transfer if a parasitic power loss estimate is outside a range.

17 Claims, 11 Drawing Sheets

Related U.S. Application Data

(60) Provisional application No. 62/015,586, filed on Jun. 23, 2014.

(51) Int. Cl.
*H02J 50/90* (2016.01)
*H02J 50/12* (2016.01)

(56) References Cited

U.S. PATENT DOCUMENTS

| | | |
|---|---|---|
| 2002/0040329 A1 | 4/2002 | Cohen |
| 2002/0078144 A1 | 6/2002 | Lamkin |
| 2002/0108114 A1 | 8/2002 | Shinohara |
| 2003/0002863 A1 | 1/2003 | Shinohara |
| 2003/0084460 A1 | 5/2003 | Chung |
| 2011/0196544 A1 | 8/2011 | Baarman et al. |
| 2012/0001493 A1 | 1/2012 | Kudo |
| 2013/0076153 A1 | 3/2013 | Fukuda |
| 2013/0257168 A1 | 10/2013 | Singh |
| 2014/0077615 A1 | 3/2014 | Stevens et al. |
| 2014/0203659 A1 | 7/2014 | Madawala |
| 2015/0171633 A1 | 6/2015 | Nakano et al. |
| 2016/0218567 A1 | 7/2016 | Nakano |

FOREIGN PATENT DOCUMENTS

| | | |
|---|---|---|
| WO | 2014060871 A1 | 4/2014 |
| WO | 2015007696 A1 | 1/2015 |

OTHER PUBLICATIONS

Kuyvenhoven, N. et al., "Development of a Foreign Object Detection and Analysis Method for Wireless Power Systems", Fulton Innovation, 2011.
Wireless Power Consortium, Downloaded From http://www.wirelesspowerconsortium.com/index.html on Sep. 9, 2015, 7 Pages.
Blue-Ray Disc White Paper Blu-Ray Disc Format, 3. File System Specifications for BD-RE, R, ROM, Aug. 2004, pp. 1-6.

* cited by examiner

WIRELESS INDUCTIVE POWER TRANSFER

CROSS-REFERENCE TO PRIOR APPLICATIONS

This application is a continuation of U.S. patent application Ser. No. 15/124,043, filed: Sep. 7, 2016 which is the National Phase Application under 35 U.S.C. § 371 of International Application No. PCT/EP2015/054206, filed on Feb. 27, 2015, which claims the benefit of European Patent Application No. 14161394.3, filed on Mar. 25, 2014 and U.S. Provisional Application 62/015,586, filed on Jun. 23, 2014 and All these applications are hereby incorporated herein in whole by reference.

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

A potential problem with wireless power transfer is that power may unintentionally be transferred to e.g. metallic objects. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may indeed result in a risk of pain and damage to humans subsequently picking up the objects.

Experiments have shown that metal objects positioned at the surface of a power transmitter can reach an undesired high temperature (higher than 60° C.) at normal environment temperatures (20° C.) even for power dissipation in the object being as low as 500 mW. For comparison, skin burning caused by contact with hot objects starts at temperatures of around 65° C.

In order to prevent such scenarios, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected.

The power dissipation in a foreign object can be estimated from the difference between transmitted and received power. In order to prevent that too much power is dissipated in a foreign object, the transmitter can terminate the power transfer if the power loss exceeds a threshold.

In the Qi power transfer standard, the power receiver estimates its received power e.g. by measuring the rectified voltage and current, multiplying them and adding an estimate of the internal power losses in the power receiver (e.g. losses of the rectifier, the receive coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. estimated power loss in the inverter, the primary coil and metal parts that are part of the power transmitter.

The power transmitter can estimate the power loss by subtracting the reported received power from the transmitted power. If the difference exceeds a threshold, the transmitter will assume that too much power is dissipated in a foreign object and it can then proceed to terminate the power transfer.

Specifically, the power transfer is terminated when the estimated power loss $P_T-P_R$ is larger than a threshold where $P_T$ is the estimated transmitted power and $P_R$ is the estimated received power.

The measurements may be synchronized between the power receiver and the power transmitter. In order to achieve this, the power receiver can communicate the parameters of a time-window to the power transmitter during configuration. This time window indicates the period in which the power receiver determines the average of the received power. The time window is defined relative to a reference time which is the time when the first bit of a received power packet is communicated from power receiver to power transmitter. The configuration parameters for this time window consist of a duration of the window and a start time relative to the reference time.

When performing this power loss detection, it is important that the power loss is determined with sufficient accuracy to ensure that the presence of a foreign object is detected. Firstly, it must be ensured that a foreign object which absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate to not result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected.

Conversely, if the power receiver underestimates the received power, this may lead to false detections where the power transmitter terminates the power transfer despite no foreign objects being present.

In order to obtain the desired accuracy, it has been proposed that the power transmitter and power receiver are calibrated to each other before power transfer at least at higher levels is performed. However, although such an approach may be desirable in many scenarios, it may also be considered inconvenient to the user as such calibrations may at best delay the power transfer, and may in many scenarios require user involvement before power transfer can proceed. Such user involvement tends to be considered cumbersome and inconvenient by consumers and accordingly it is typically desired that user involvement can be minimized and preferably avoided.

An improved power transfer system would accordingly be advantageous. In particular, an approach that allows improved operation while maintaining a user friendly approach would be advantageous. Particularly, an approach that allows easier user operation while ensuring safe operation, especially at higher power levels, would be advantageous. An improved power transfer system allowing increased flexibility, facilitated implementation, facilitated operation, safer operation, reduced risk of foreign object heating, increased detection accuracy, reduced user involvement and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter (101) for a wireless power transfer system including a power receiver (105) for receiving a power transfer from the power transmitter via a wireless inductive power signal;
the power transmitter (101) comprising: a transmit power inductor (103) for generating the wireless inductive power signal; a first detector (209) arranged to generate, when in a test mode, a foreign object detection estimate in response to a comparison of a first measured load of the wireless inductive power signal to an expected load of the wireless inductive power signal when the power receiver is operating in a test mode, a loading of the wireless inductive power signal by the power receiver when operating in the test mode being constrained relative to the loading of the wireless inductive power signal by the power receiver when operating in a power transfer mode during a power transfer phase; a controller (211) for entering at least one of the power transmitter (101) and the power receiver (103) into a power transfer mode when the foreign object detection estimate indicates that no foreign object is present; a second detector (207) arranged to, when in the power transfer mode, generate a parasitic power loss detection for the power transfer in response to a parasitic power loss estimate exceeding a threshold; and a calibration unit (213) for initializing an adaptation of a first parameter of the parasitic power loss detection in response to operating parameter values for the power transfer phase, the calibration unit (213) being arranged to exclude from the adaptation operating parameter values for the power transfer phase that are for times outside of an initial time interval of entering the power transfer phase following the foreign object detection estimate indicating that no foreign object is present.

The approach may provide improved operation in many scenarios. In particular, in many embodiments it may allow an improved user experience, and indeed, in many embodiments, it may allow reduced risk of unnecessary power transfer terminations while maintaining a very low risk of unacceptable heating of foreign objects. The user involvement required to improve a parasitic power loss or foreign object detection may be reduced in many embodiments.

The approach may allow for potential detection of foreign objects extracting power from the wireless inductive power signal in different modes of operation. Specifically, an evaluation of whether a foreign object is present can be performed in both a test mode and a power transfer mode. However, when in the test mode, the power receiver operation is constrained which may reduce the uncertainty of the operational impact of the power receiver on the wireless inductive power signal. The constrained operation may provide a more predictable scenario which may specifically reduce the uncertainty of the load of the wireless inductive power signal resulting from the power receiver. This makes a detection of other potential loads more reliable, and may specifically make a detection of a potential loading by a foreign object more reliable. Thus, typically, detection of whether a foreign object is present is significantly more reliable and/or accurate in the test mode than in the power transfer mode.

The detection reliability of the test mode may be significantly higher than in the power transfer mode. Specifically, the foreign object detector may be based on the operation of the power receiver being constrained whereas the parasitic power loss detector does not rely on such a constraint.

The approach of executing a test mode foreign object detection, and entering the power transfer phase conditionally on the outcome of this detection, may further improve the reliability of the parasitic power loss detector during the power phase. Also, adapting the parasitic power loss detection based on operating parameter values in an initial time interval of entering the power transfer phase but not based on operating parameter values of the power transfer phase outside this initial time interval, allows a reliable calibration of the parasitic power loss detection to be performed thereby increasing the detection reliability.

For example, due to the highly reliable detection during the test mode, it can typically be assumed that a lack of detecting any foreign object ensures that the power transfer phase is initialized with no foreign object being present. Accordingly, the initial characteristics of the power transfer phase can be assumed to correspond to there being no foreign object present. The initial measured properties generated by the parasitic power loss detection may be assumed to correspond to no foreign object being present, and accordingly the parasitic power loss can preferably use the initial measured properties as reference or calibration values. The parasitic power loss detection may accordingly be in response to initial measured properties when entering the power transfer mode. This may provide a more accurate detection. Thus, in many scenarios, the approach may avoid that the parasitic power loss detection needs to be based on absolute values but can instead fully or partially be based on relative properties.

The calibration/adaptation approach may provide improved performance and may in many scenarios allow improved reliability, and/or increased fault protection/detection. The approach may in particular allow an improved parasitic power loss detection, and may allow this to be adapted to the specific characteristics of the individual scenario and/or embodiment.

The approach may exploit the fact that a more accurate foreign object detection of the test mode may provide a high degree of certainty that when the system enters the power transfer mode, no foreign object is present. The characteristics at the initialization of the power transfer mode/power transfer phase can accordingly be considered to reflect the scenario where no foreign object is present. By adapting the parasitic power loss detection to these characteristics, an improved detection of deviations caused by the presence of a foreign object can be achieved.

The adaptation may be a short term adaptation, such as an adaptation which is only used for the current power transfer operation. This may for example allow an adaptation to the specific position of the power receiver relative to the power transmitter for the current operation without affecting performance for subsequent power transfer operations where the relative positioning of the devices may be different.

In many embodiments, the adaptation may be a long term adaptation which adapts the parameter for typically both the current power transfer mode operation as for future power transfer mode operations. The adaption may be specific to the power transmitter and power receiver pair.

A detection of the parasitic power loss may specifically be a detection that a parasitic power loss (e.g. estimated from transmit power and receive power estimates) exceeds a threshold (specifically the upper limit of the range). The parasitic power loss detector may thus generate a parasitic power loss detection if a determined parasitic power loss exceeds a threshold. If a parasitic power loss is detected during the initial time interval after entering the power transfer mode, this threshold may for example be increased to reduce sensitivity of the detection to result in fewer "false positives".

Alternatively or additionally, if it is detected that the estimated parasitic power loss (e.g. estimated from transmit power and receive power estimates) is too far below a threshold, the threshold may be reduced to increase sensitivity of the detection to prevent missed detections where a parasitic power loss caused by a foreign object is not detected.

The adaptation may in response to characteristics during the initial time interval adapt a parasitic power loss detection operation performed by the parasitic power loss detector to detect parasitic power losses such that the detection probability is reduced. Especially, the false detection probability is reduced. This may specifically be achieved by detecting the parasitic power loss estimate exceeding a threshold.

Alternatively or additionally, the adaptation may in response to characteristics during the initial time interval adapt a parasitic power loss detection operation performed by the parasitic power loss detector to detect parasitic power losses such that the detection probability is increased. Especially, the probability of missing a detection of an excessive power loss may be reduced. This may specifically be achieved by detecting the parasitic power loss estimate falling below a threshold.

The parasitic power loss detector may be arranged to continuously during the power transfer mode perform a parasitic power loss detection algorithm. The adaptation may adapt the parasitic power loss detection algorithm for future power transfers.

The wireless power transfer system/the power transmitter may remain in the power transfer phase after the initial time interval. Thus, for at least some power transfer phases, the initial time interval will be shorter than the duration of the power transfer phase. Indeed, often it will be much shorter, e.g. the initial time interval may last 2-30 seconds with the power transfer phase lasting many minutes or potentially several hours.

When the system is in the test mode, the power of the wireless inductive power signal may be substantially reduced relative to a maximum allowable power when in the power transfer phase. For example, in many scenarios the maximum power of the wireless inductive power signal when in the test mode may be restricted to be less than, say, 10% or 25% of the maximum allowable power when in the power transfer phase.

The loading of the wireless inductive power signal by the power receiver may be constrained in the test mode relative to the power transfer mode. The load of the power receiver may in many embodiments be constrained in the test mode. Specifically, a load of the power receiver may be constrained to a smaller range in the test mode than in the power transfer mode. In many embodiments, the load of the power receiver during the test may be constrained to a predetermined (fixed) load. The load may specifically be zero, i.e. the power receiver load may be disconnected during the test mode.

In many embodiments, a load of the power receiver is predetermined and/or a power of the wireless power transfer signal is limited to below a threshold when in the test mode. The threshold may be below e.g. 1 W. In many embodiments, the threshold is no more than 50%, or in some embodiments 20% or 10%, of the maximum power level of the wireless inductive power signal (when in the power transfer mode). In many embodiments, the power receiver is arranged to not perform load modulation when in the test mode.

In many embodiments, the foreign object detection estimate may be a binary estimate indicating either that a foreign object has been detected or that a foreign object has not been detected.

A parasitic power loss may be any power dissipated from the power signal, which is not dissipated by the power receiver.

A detection of the parasitic power loss may specifically be a detection that a parasitic power loss (e.g. estimated from transmit power and receive power estimates) exceeds a threshold (specifically the upper limit of the range). The parasitic power loss detector may thus generate a parasitic power loss detection if a determined parasitic power loss exceeds a threshold.

In some embodiments, a foreign object detection estimate may be generated using the same approach as for the parasitic power loss detection but with e.g. the decision criterion changed to reflect the constrained operation of the power receiver.

The power receiver/power transmitter may enter the power transfer mode directly from the test mode, or may enter via one or more intervening modes of operation.

The controller may enter the power transmitter into the power transfer mode by directly controlling the mode of operation of the power transmitter, or may e.g. enter the power transmitter into the power transfer mode by initializing a process that results in the power transmitter being in the power transfer mode. For example, the controller may enter the power transmitter into the power transfer mode by transmitting a message to an external entity (such as the power receiver) which causes the external entity to perform an operating which can result in the power transmitter entering the power transfer mode, such as for example the external entity transmitting a message to the power transmitter causing this to enter the power transfer mode.

The controller may enter the power receiver into the power transfer mode by e.g. transmitting a message to the power receiver resulting in this entering the power transfer mode.

When performing the foreign object detection, the foreign object detector assumes that the power receiver is operating in the test mode. Specifically, the foreign object detector assumes that the loading of the wireless inductive power signal by the power receiver is constrained relative to the (allowable) loading of the wireless inductive power signal by the power receiver when operating in the power transfer mode during. Specifically, when the power receiver is operating in the test mode the dynamic range for a loading of the wireless inductive power signal by the power receiver (is assumed to be) constrained relative to an (allowable) dynamic range for the loading of the wireless inductive power signal by the power receiver when this is operating in the power transfer mode during the power transfer phase.

In many embodiments, the foreign objection detection estimate may be a parasitic power loss estimate. It may in many scenarios be determined as a distance measure between an estimate indicative of the first measured load and a value indicative of the expected load of the wireless inductive power signal when the power receiver is operating in the test mode. The foreign object detection may in many embodiments be a parasitic power loss detection, and likewise in many embodiments, the parasitic power loss detection may be used for foreign object detection. Thus, in many scenarios the foreign object detection of the first detector may be synonymous with a first parasitic power loss detection and the foreign object detection estimate may be synonymous with a first parasitic power loss estimate (with the second detector performing second parasitic power loss detection using a second parasitic power loss estimate). Similarly, in many embodiments, the first detector may perform a first foreign object detection, and the parasitic power loss detection of the second detector may be synonymous with a second foreign object detection, and the parasitic power loss estimate may be synonymous with a second foreign object detection estimate.

The expected load of the wireless inductive power signal when the power receiver is operating in the test mode is limited in comparison to an expected load of the wireless inductive power signal when the power receiver is operating in the power transfer mode. In many embodiments, the dynamic range of the expected load of the wireless inductive power signal when the power receiver is operating in the test mode is smaller (often by a factor of 2, 3 or 5 times) in comparison to a dynamic range of an expected load of the wireless inductive power signal when the power receiver is operating in the power transfer mode. In many embodiments, the expected load of the wireless inductive power signal when the power receiver is operating in the power transfer mode may be a predetermined load (and may be inherently known at both the power receiver and transmitter).

In many embodiments, the parasitic power loss estimate may be generated from a difference measure applied to a transmit power measure and a receive power measure, the transmit power measure being indicative of a power provided to the transmit inductor/the wireless inductive power signal by the power transmitter, and the receive power measure being indicative of a power extracted from the wireless inductive power signal by the power receiver. The receive power measure and/or transmit power measure may be generated in the power receiver and power transmitter respectively and communicated to the second detector by suitable external or internal communication links.

In accordance with an optional feature of the invention, the power transmitter further comprises a communicator for transmitting a test mode request to the power receiver, the test mode request providing a request for the power receiver to enter the test mode wherein the loading of the wireless inductive power signal by the power receiver is constrained relative to the loading of the wireless inductive power signal by the power receiver when operating in the power transfer mode during the power transfer phase.

This may provide efficient and improved operation in many embodiments. In particular, it may allow an efficient approach for aligning the test mode operations of the power transmitter with the power receiver. It may specifically, allow the power transmitter to control the power receiver to enter the test mode wherein a more accurate foreign object detection can be performed based on the loading being constrained.

In accordance with an optional feature of the invention, the power transmitter further comprises a communicator (501) for receiving a test mode initiation message from the power receiver, the test mode initiation indication being indicative of the power receiver entering the test mode wherein the loading of the wireless inductive power signal by the power receiver is constrained relative to the loading of the wireless inductive power signal by the power receiver when operating in the power transfer mode during the power transfer phase; and wherein the foreign object detector (209)

is arranged to perform the foreign object detection in response to receiving the test mode initiation message This may provide efficient and improved operation in many embodiments. In particular, it may allow an efficient approach for aligning the test mode operations of the power transmitter with the power receiver. It may specifically, allow the power receiver to control the power transmitter to enter the test mode wherein a more accurate foreign object detection can be performed based on the loading being constrained.

In accordance with an optional feature of the invention, the operating parameter values include at least one of a receive power estimate and a transmit power estimate determined from measurements within the initial time interval.

This may provide particularly efficient performance. The transmit power estimate may be indicative of a power provided to the transmit inductor/the wireless inductive power signal by the power transmitter. The receive power estimate may be indicative of a power extracted from the wireless inductive power signal by the power receiver. The receive power estimate and/or transmit power estimate may be generated in the power receiver and power transmitter respectively and communicated to the second detector by suitable external or internal communication links.

In some embodiments, the controller may be arranged to switch at least one of the power transmitter and the power receiver from the power transfer mode into the test mode in response to a detection that an operating parameter exceeds a reference operating range during the power transfer mode.

This may allow improved operation and/or improved performance. In particular, it may in many embodiments allow improved detection of the parasitic power losses, e.g. resulting from foreign objects.

For example, the approach may in many embodiments allow a system to detect potentially undesired situations, such as e.g. the potential presence of a foreign object, or a reduced ability to detect a foreign object. In response to such a detection, the system may enter the test mode for a more reliable detection. If this confirms the potential undesired situation, the system may take action, e.g. if a foreign object is detected, the power may be reduced. However, if the more reliable detection indicates that the potential undesired situation is not present, the system may re-enter the power transfer mode to continue power transfer. Thus, a substantially improved user experience can be achieved by the system being able to automatically recover from a potentially undesired scenario without requiring explicit user input or control. Such an ability may for example also allow the parameters for the parasitic power loss detection to be set to have a higher probability of detecting even smaller parasitic power losses, and thus with an increased risk of false detections, thereby reducing the risk of a foreign object not being detected.

The controller may enter the power transmitter into the test mode by directly controlling the mode of operation of the power transmitter, or may e.g. enter the power transmitter into the test mode by initializing a process that results in the power transmitter being in the test mode. For example, the controller may enter the power transmitter into the test mode by transmitting a message to an external entity (such as the power receiver) which causes the external entity to perform an operating which can result in the power transmitter entering the test mode, such as for example the external entity transmitting a message to the power transmitter causing this to enter the test mode.

The controller may enter the power receiver into the test mode by e.g. transmitting a message to the power receiver resulting in this entering the test mode.

In accordance with an optional feature of the invention, the power transmitter is arranged to transmit at least one foreign object detection estimate indication to the power receiver.

This may provide improved operation/performance. In particular, it may allow the power receiver to be able to control how the system reacts to potential detections of foreign objects in the test mode. The foreign object detection estimate indication may be any data indicating the outcome of a foreign object detection estimation, and specifically may be any indication of the foreign object detection estimate.

In some embodiments, the calibration unit may initialize an adaptation of a parameter of the parasitic power loss detection upon entering the power transfer phase.

This may provide improved performance and may in many scenarios allow improved reliability, and/or increased fault protection/detection. The approach may in particular allow an improved parasitic power loss detection, and may allow this to be adapted to the specific characteristics of the individual scenario and/or embodiment.

In some embodiments, the calibration unit may be arranged to terminate the adaptation of the parameter while remaining in the power transfer phase.

This may be particularly suited to real time adaptation wherein the parasitic power loss detection is adapted in real time based on current conditions, and may allow improved adaptation in many embodiments (without affecting power provision). For example, the risk that a foreign object is present may increase the longer the duration since the accurate foreign object detection of the test mode. Accordingly, it may be desirable to terminate the adaptation to ensure that this is not based on an undesired scenario, such as when a small foreign object (possibly undetectable by the parasitic power loss detection) is present.

The termination of the adaptation may be in response to a detection of an event, such as the expiry of a timer. The calibration unit may in some embodiments be arranged to terminate after a predetermined time interval since the initialization of the power transfer mode.

In accordance with an optional feature of the invention, the calibration unit is arranged to terminate the initial time interval in response to a detection that a power transfer parameter exceeds a reference operating range.

This may provide an improved and/or more flexible adaptation. In particular, it may in many scenarios allow a longer adaptation and/or may prevent adaptation to potentially undesired scenarios. Specifically, in many scenarios, the calibration unit may be arranged to terminate the adaptation if the operating parameter changes by more than a given amount. Thus, in some embodiments the reference operating range may be a relative operating range determined in response to at least one earlier value of the operating parameter, such as specifically the value at the beginning/initialization of the power transfer mode.

The operating parameter may for example be a loading of the wireless inductive power signal and/or an available power of the wireless inductive power signal.

In some embodiments, the calibration unit is arranged to terminate the adaptation in response to a detection of a change in a loading of the wireless power transfer signal.

In some embodiments, the calibration unit is arranged to terminate the adaptation in response to a determination that a duration of the power transfer mode has exceeded a threshold.

In accordance with an optional feature of the invention, the calibration unit is arranged to terminate the initial time interval in response to a detection of a change in a loading of the wireless power transfer signal.

This may provide improved adaptation leading to more reliable parasitic power loss detection in many scenarios. It may in particular provide an efficient way of detecting an increased risk of a foreign object potentially being present, and of adapting the adaptation to this increased risk.

In accordance with an optional feature of the invention, the calibration unit is arranged to terminate the initial time interval in response to a detection that a duration of the initial time interval exceeds a threshold.

This may in many embodiments provide improved adaptation leading to more reliable parasitic power loss detection. In particular, it may allow low complexity operation.

In accordance with an optional feature of the invention, the first parameter is at least one of a parasitic power loss estimate calculation parameter and an end-point of the range.

This may provide efficient, yet low complexity adaptation. The adaptation may for example change an upper or lower detection threshold for the parasitic power loss estimate (and end-point of the range), e.g. such that the detection range is centralized around the parasitic power loss estimate determined for the initial time interval. In some embodiments, the calculation of the parasitic power loss may be adapted, e.g. by adding an offset to the determined transmit power estimate, receive power estimate, or difference between these. The offset may for example be such that the difference between the transmit and receive power is zero for the operating parameter values of the initial time interval.

In accordance with an optional feature of the invention, the calibration unit is arranged to discard from the adaptation at least a first operating parameter value for a first operating parameter in response to a comparison of the first operating parameter value to an expected value for the first operating parameter.

This may improve the adaptation and may result in more reliable parasitic power loss detection. Specifically, the use of operating parameter values may be subject to these being considered reasonable, which may be assessed based on a comparison of the operating parameter values to expected values. Specifically, if the first operating parameter value and the expected value meet a difference criterion (e.g. the first operating parameter value differs from an expected value by more than a given amount (e.g. it does not fall within an expected range of values)), then the value may be discarded from further consideration when performing the adaptation.

In accordance with an optional feature of the invention, the calibration unit is arranged to receive a plurality of receive power estimates from the power receiver during the initial time interval, the plurality of receive power estimates providing indications of a power received by the power receiver 105 for different loads of the power receiver; and the calibration unit is arranged to adapt a plurality of parameters of the parasitic power loss detection in response to the plurality of receive power estimates.

This may provide improved parasitic power loss detection in many embodiments and scenarios. In particular, it may provide a plurality of data points allowing the parasitic power loss detection to be adapted more flexibly and accurately, and for a wider range of operating points. It may typically allow the adaptation to compensate for higher order effects. The provision of a plurality of receive power estimates at the initialization of the power transfer phase, may provide a particularly suitable set of data points, including often a data point close to a minimum load and a data point close to a maximum load.

The plurality of parameters may include first order or higher order compensation parameters, such as e.g. a first derivative of a compensation function providing a compensated parameter from an input parameter, where the compensated parameter is then used for the foreign object detection, and specifically where the compensated parameter replaces the input parameter. The input parameter may specifically be a receive power estimate or a transmit power estimate, and the compensated receive power estimate or transmit power estimate may subsequently be used to generate a parasitic power loss estimate which may be compared to a detection threshold.

In accordance with an optional feature of the invention, the calibration unit is arranged to adapt at least one of a calibration offset and a calibration scale factor for at least one of a transmitter power estimate and a receive power estimate in response to the plurality of receive power estimates.

This may allow particularly advantageous adaptation and may specifically allow an improved foreign object detection for a range of different operating scenarios, including a range of different loads.

In accordance with an optional feature of the invention, the plurality of receive power estimates comprises at least one receive power estimate prior to a powering of a load of the power receiver in the power transfer phase and at least one receive power estimate following the powering of the load of the power receiver.

This may provide particularly advantageous operation in many embodiments, and may specifically in many scenarios allow adaptation to both high and low power loads. In many scenarios, the approach may provide suitable information for adaptation while maintaining compatibility with other requirements of the power transfer system. In particular, in many embodiments, the information may be provided with no modifications being required to the power transfer operation.

In accordance with an optional feature of the invention, the calibration unit is arranged to compare a first receive power estimate to a transmit power estimate for the power transfer signal; and to discard the first receive power estimate if the comparison is indicative of a difference between the first receive power estimate and transmit power estimate exceeding a threshold.

This may provide improved operation in many embodiments and scenarios, and may specifically reduce the risk of adaptation of the parasitic power loss estimation in a situation where a foreign object is present. It may also reduce the risk of the power transmitter adapting in a situation where the received power estimate is erroneous, e.g. due to a fault in the power receiver. Thus, the approach provides a reduced risk of adapting to undesired scenarios.

In accordance with an optional feature of the invention, the power transmitter is arranged to vary a frequency of a drive signal for the transmitter coil over a range comprising a resonance frequency of a resonance circuit comprising the transmitter coil, the power transmitter further comprising a power controller arranged to adapt at least one of a voltage amplitude and a duty cycle of the drive signal to restrict at least one of a current of the transmitter coil and a product of a frequency of the drive signal and a current of the transmitter coil within a range.

This may provide improved performance, and may specifically prevent excessive voltage being induced at the power receiver. The range may be a predetermine range.

In accordance with an optional feature of the invention, the first measured load comprises a power load indication for an output circuit of the power transmitter, the output circuit comprising the power transmit inductor.

This may provide an efficient and reliable foreign object detection during the test mode. Further, a low complexity foreign object detection can be achieved in many embodiments.

The output circuit of the power transmitter may specifically comprise or consist of a resonance circuit including the power transmit inductor.

In many embodiments, the power receiver is arranged to set a power loading of the wireless power transfer signal to a predetermined level when in the test mode, i.e. when determining the power load indication.

In accordance with an optional feature of the invention, the first measured load comprises an impedance indication for an impedance of an output circuit of the power transmitter, the output circuit comprising the power transmit inductor.

This may provide an efficient and reliable foreign object detection during the test mode. Further, a low complexity foreign object detection can be achieved in many embodiments.

In some embodiments, the impedance indication may comprise an indication of at least one of: an equivalent series resistance of the output circuit; a phase difference between voltage and current for the output circuit; a current of the power transmit inductor; and an absolute impedance of the output circuit.

In accordance with an optional feature of the invention, the power transmitter further comprises a calibration unit for adapting a parameter of the power loss detection in response to the first measured load.

This may allow an improved foreign object detection, and may e.g. allow the foreign object to be adapted to the specific power transmitter and power receiver pair.

In some embodiments, the controller may be arranged to enter the system into a further test mode from the test mode if the foreign object detection estimate is indicative of a detection of a foreign object; and the controller may be arranged to receive a user input in the second test mode, and an adaptation of the generation of the foreign object detection estimate may be dependent on the user input indicating that no foreign object is present.

According to an aspect of the invention there is provided a wireless power transfer system including a power transmitter (101) arranged to provide a power transfer to a power receiver (105) via a wireless inductive power signal; the power transmitter (101) comprising a transmit power inductor (103) for generating the wireless inductive power signal; the power receiver (105) being arranged to operate in at least a test mode or a power transfer mode, a loading of the wireless inductive power signal by the power receiver when operating in the test mode being constrained relative to the loading of the wireless inductive power signal by the power receiver when operating in the power transfer mode during a power transfer phase; and the wireless power transfer system comprising: a first detector (209) arranged to generate, when in a test mode, a foreign object detection estimate in response to a comparison of a first measured load of the wireless inductive power signal to an expected load of the wireless inductive power signal when the power receiver is operating in the test mode; a controller (211) for entering at least one of the power transmitter (101) and the power receiver (103) into a power transfer mode when the foreign object detection estimate indicates that no detection foreign object is present; a second detector (207) arranged to, when in a power transfer mode, generate a parasitic power loss detection for the power transfer in response to a parasitic power loss estimate exceeding a threshold; and a calibration unit (213) for initializing an adaptation of a first parameter of the parasitic power loss detection in response to operating parameter values for the power transfer phase, the calibration unit (213) being arranged to exclude from the adaptation operating parameter values for the power transfer phase that are for times outside of an initial time interval of entering the power transfer phase following the foreign object detection estimate indicating that no foreign object is present.

The foreign object detection estimate may be generated when the device in which the first foreign object detector is included is operating in the test mode, and/or in many scenarios it may be required that both the power receiver and the power transmitter are in the test mode. The parasitic power loss detection may be performed when the device in which the first foreign object detector is included is operating in the power transfer mode; and/or in many scenarios it may be required that both the power receiver and the power transmitter are in the power transfer mode.

In many embodiments, the controller may be arranged to switch at least one of the power transmitter and the power receiver from the power transfer mode into the test mode in response to a detection that an operating parameter exceeds a reference operating range during the power transfer mode.

In many embodiments, the controller may be arranged to enter the power transmitter into the test mode in response to a parasitic power loss detection.

If the controller is part of the power receiver, the operating parameter may for example be a power level of the wireless inductive power signal, and specifically the controller may switch at least one of the power transmitter and the power receiver from the power transfer mode into the test mode in response to a detection of a reduction of the available power that can be extracted from the wireless inductive power signal.

In accordance with an optional feature of the invention, the power receiver is arranged to transmit a test mode initiation command to the power transmitter, and the power transmitter is arranged to enter the test mode in response to receiving the test mode initiation command.

This may provide improved performance in many scenarios. In particular, it may allow the power receiver to control when the system enters the test mode. This may in particular provide improved backwards compatibility in systems in which the operation is predominantly power receiver controlled, such as for example the Qi system.

It may furthermore, allow for communication and control protocols and systems wherein for example asymmetric communication channels are implemented.

The power receiver may also enter the test mode when transmitting the test mode initiation command. The test mode initiation command may specifically be any data providing a request or instruction for the power transmitter to enter the test mode.

In some embodiments, the test mode initiation command may comprise an indication of a duration in which the power receiver will remain in the test mode, such as specifically a minimum duration it will remain in the test mode.

In accordance with an optional feature of the invention, the power transmitter is arranged to transmit a parasitic power loss detection indication to the power receiver when detecting a parasitic power loss, and the power receiver is arranged to transmit the test mode initiation command to the power transmitter in response to receiving one or more parasitic power loss detection indications.

This may provide improved and/or facilitated operation in many embodiments, and/or may allow improved backwards compatibility, e.g. with systems such as the Qi power transfer system. The feature may in particular allow for power receiver based control of the operation of the power transfer and/or may enable or facilitate communication while allowing the parasitic power loss detector to be implemented in the power transmitter. The parasitic power loss detection indication may be any data indicating the outcome of a parasitic power loss detection, and specifically may be any indication of the parasitic power loss estimate.

In accordance with an optional feature of the invention, the power transmitter is arranged to transmit a parasitic power loss detection indication to the power receiver by not acknowledging a power control loop message received from the power receiver.

This may allow a highly efficient communication, and in particular may allow implementation of a very low data rate communication link from the power transmitter to the power receiver.

In accordance with an optional feature of the invention, the power receiver is arranged to transmit the test mode initiation command in response to a detection of a change in power received by the power receiver.

This may allow improved operation in many scenarios.

In accordance with an optional feature of the invention, the power receiver is arranged to transmit a test mode termination command to the power transmitter, and the power transmitter is arranged to enter the power transfer mode in response to receiving the test mode termination command.

This may provide improved performance in many scenarios. In particular, it may allow the power receiver to control when the system exits the test mode. This may in particular provide improved backwards compatibility in systems in which the operation is predominantly power receiver controlled, such as for example the Qi system.

It may furthermore, allow for communication and control protocols and systems wherein for example asymmetric communication channels are implemented.

The power receiver may also enter the power transfer mode in connection with transmitting the test mode termination command. The test mode termination command may specifically be any data providing a request or instruction for the power transmitter to terminate the test mode.

The power receiver may specifically transmit the test mode termination command in response to receiving a foreign object detection estimate indication from the power transmitter indicating that no foreign object has been detected in the test mode.

The power receiver/power transmitter may enter the power transfer mode directly from the test mode, or may enter via one or more intervening modes of operation.

In accordance with an optional feature of the invention, the power transmitter is arranged to transmit a foreign object detection estimate indication to the power receiver when in the test mode, and the power receiver is arranged to exit the test mode in response to receiving a foreign object detection estimate indication indicative of no foreign object detection and to remain in the test mode in response to receiving a foreign object detection estimate indication indicative of a foreign object detection.

This may provide improved operation/performance. The foreign object detection estimate indication may be any data indicating the outcome of a foreign object detection, and specifically may be any indication of the foreign object detection estimate.

In accordance with an optional feature of the invention, the power receiver is arranged to transmit a plurality of receive power estimates to the power transmitter within a time interval of entering the power transfer mode, the plurality of receive power estimates providing indications of power received by the power receiver from power transfer signal for different loads of the power receiver; and the power transmitter comprises a calibration unit for performing an adaptation of a parameter of the parasitic power loss detection upon entering the power transfer phase, the calibration unit being arranged to adapt a plurality of parameters of the parasitic power loss detection in response to the plurality of received power estimates received from the power receiver.

This may provide improved parasitic power loss detection in many embodiments and scenarios. In particular, it may provide a plurality of data points allowing the parasitic power loss detection to be adapted more flexibly and accurately, and for a wider range of operating points. It may typically allow adaptation to compensate for higher order effects. The provision of a plurality of receive power estimates at the initialization of the power transfer phase may provide a particularly suitable set of data points, including often a data point close to a minimum load and a data point close to maximum load. It may further allow the adaptation to be performed when the risk of a foreign object being present is very low.

In accordance with an optional feature of the invention, the power receiver is arranged to generate at least one receive power estimate prior to providing power to a load of the power receiver in a power transfer mode; and at least one receive power estimate after providing power to the load of the power receiver.

This may provide particularly advantageous operation in many embodiments, and may specifically in many scenarios allow adaptation to both high and low power loads. In many scenarios, the approach may provide suitable information for adaptation while maintaining compatibility with other requirements of the power transfer system. In particular, in many embodiments, the information may be provided with no modifications being required to the power transfer operation.

In accordance with an optional feature of the invention, the time interval is no more than 30 seconds.

This may provide improved performance in many embodiments, and may in particular ensure a low risk of the adaptation being performed when a foreign object is present.

According to an aspect of the invention there is provided a power receiver for a wireless power transfer system including a power transmitter (101) arranged to provide a power transfer to the power receiver (105) via a wireless inductive power signal generated by a transmit power inductor (103) of the power transmitter (101); the power receiver (105) being arranged to operate in at least a test mode or a power transfer mode, a loading of the wireless inductive power signal by the power receiver when operating in the test mode being constrained relative to the loading of the wireless inductive power signal by the power receiver when operating in the power transfer mode during a power transfer phase; and the power receiver (105) comprising: a first detector (209) arranged to generate, when in a test mode, a foreign object detection estimate in response to a comparison of a first measured load of the wireless inductive power signal to an expected load of the wireless inductive power signal when the power receiver is operating in the test mode; a controller (211) for entering at least one of the power transmitter (101) and the power receiver (103) into a power transfer mode when the foreign object detection estimate indicates that no foreign object is present; a second detector (207) arranged to, when in the power transfer mode, generate a parasitic power loss detection for the power transfer in response to a parasitic power loss estimate exceeding a threshold; and a calibration unit (213) for initializing an adaptation of a first parameter of the parasitic power loss detection in response to operating parameter values for the power transfer phase, the calibration unit (213) being arranged to exclude from the adaptation operating parameter values for the power transfer phase that are for times outside of an initial time interval of entering the power transfer phase following the foreign object detection estimate indicating that no foreign object is present.

According to an aspect of the invention there is provided a method of operation for a wireless power transfer system including a power transmitter (101) arranged to provide a power transfer to a power receiver (105) via a wireless inductive power signal generated by a transmit power inductor (103) of the power transmitter (101); the method comprising: generating, when in a test mode, a foreign object detection estimate in response to a comparison of a first measured load of the wireless inductive power signal to an expected load of the wireless inductive power signal when the power receiver (105) is operating in a test mode, a loading of the wireless inductive power signal by the power receiver when operating in the test mode being constrained relative to the loading of the wireless inductive power signal by the power receiver when operating in a power transfer mode during a power transfer phase; entering at least one of the power transmitter (101) and the power receiver (103) into a power transfer mode when the foreign object detection estimate indicates that no foreign object is detected; and generating, when in the power transfer mode, a parasitic power loss detection for the power transfer in response to a parasitic power loss estimate exceeding a threshold; initializing an adaptation of a first parameter of the parasitic power loss detection in response to operating parameter values for the power transfer phase; and excluding from the adaptation power transfer parameters for the power transfer phase that are for times outside of an initial time interval of entering the power transfer phase following the foreign object detection estimate indicating that no foreign object is present.

According to an aspect of the invention there is provided a method of operation for a power transmitter (101) for a wireless power transfer system including power receiver (105) for receiving a power transfer via a wireless inductive power signal generated by a transmit power inductor (103) of the power transmitter (101), the method comprising: generating, when in a test mode, a foreign object detection estimate in response to a comparison of a first measured load of the wireless inductive power signal to an expected load of the wireless inductive power signal when the power receiver (105) is operating in a test mode, a loading of the wireless inductive power signal by the power receiver when operating in the test mode being constrained relative to the loading of the wireless inductive power signal by the power receiver when operating in a power transfer mode during a power transfer phase; entering at least one of the power transmitter (101) and the power receiver (103) into a power transfer mode when the foreign object detection estimate indicates that no foreign object is present; generating, when in the power transfer mode, a parasitic power loss detection for the power transfer in response to a parasitic power loss estimate being outside a range; and initializing an adaptation of a first parameter of the parasitic power loss detection in response to operating parameter values for the power transfer phase; and excluding power transfer parameters for the power transfer phase from the adaptation if the operating parameter values are for times outside of an initial time interval of entering the power transfer phase following the foreign object detection estimate indicating that no foreign object is present.

According to an aspect of the invention there is provided a method of operation for a power receiver for a wireless power transfer system including a power transmitter (101) arranged to provide a power transfer to the power receiver (105) via a wireless inductive power signal; the method comprising: generating, when in a test mode, a foreign object detection estimate in response to a comparison of a first measured load of the wireless inductive power signal to an expected load of the wireless inductive power signal when the power receiver (105) is operating in a test mode, a loading of the wireless inductive power signal by the power receiver when operating in the test mode being constrained relative to the loading of the wireless inductive power signal by the power receiver when operating in a power transfer mode during a power transfer phase; entering the power receiver (103) into a power transfer mode when the foreign object detection estimate is indicates that no foreign object is present; generating, when in the power transfer mode, a parasitic power loss detection for the power transfer in response to a parasitic power loss estimate exceeds a threshold; and initializing an adaptation of a first parameter of the parasitic power loss detection in response to operating parameter values for the power transfer phase; and excluding power transfer parameters for the power transfer phase from the adaptation if the operating parameter values are for times outside of an initial time interval of entering the power transfer phase following the foreign object detection estimate indicating that no foreign object is present.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
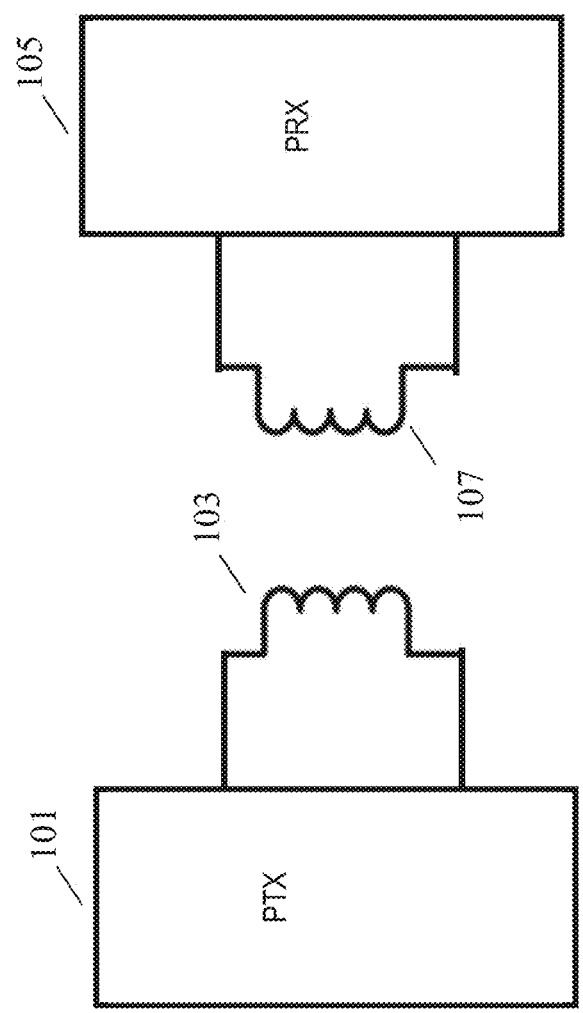
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a wireless inductive power signal (also for brevity referred to as a power signal or inductive power signal), which is propagated as a magnetic flux by the transmitter coil 103. The power signal may typically have a frequency between around 100 kHz to 200 kHz. The transmitter coil 103 and the receiver coil 105 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On the physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter 101 and power receiver 105 is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

The power transfer operation is based on a wireless magnetic flux power signal (the wireless inductive power signal, or just power signal) being generated by the power transmitter 101 and being captured by the power receiver 105. Thus, the power signal induces a voltage and current in the receive coil 107. However, the power signal will also induce currents in any other conductive material including e.g. metallic parts of the power receiver 105 or the power transmitter 101. Furthermore, if other objects, known as foreign objects, are positioned sufficiently close to the transmit coil 103, substantial currents may be induced in conductive parts of such objects. For example, substantial eddy currents may be induced which may result in heating of the object. If too much power is induced in the foreign object, this may heat up substantially. Thus, in addition to the undesirable power loss, the induced power in foreign objects may also result in undesirable, and perhaps even almost unsafe situations. As an example, a user may inadvertently put a set of keys next to a mobile phone being charged by a power transmitter. This may result in the set of keys heating substantially and potentially even sufficiently to cause the keys to burn the user when picking up the keys. The problem is exacerbated for higher powers, and has become more critical for e.g. the Qi power transfer approach when this is being expanded to higher power levels.

In order to address such risks, the Qi standard includes functionality for detecting such scenarios and terminating power transfer in response to the detection. Specifically, the power transmitter 101 may estimate the parasitic power loss (i.e. the difference between the power provided to the power signal by the power transmitter 101 and that consumed by the power receiver 105). If this exceeds a given level, it is considered likely to be due to a foreign object being present and accordingly the power transmitter 101 proceeds to terminate power transfer. Thus, the power transmitter 101 includes a foreign object detection function.

In the Qi power transfer standard, the power receiver estimates its received power e.g. by measuring the rectified voltage and current, multiplying them and adding an estimate of the internal power losses in the power receiver (e.g. losses of the rectifier, the receive coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. estimated power loss in the inverter, the primary coil and metal parts that are part of the power transmitter.

The power transmitter 101 can estimate the power loss by subtracting the reported received power from the transmitted power. If the resulting parasitic power loss estimate exceeds a detection threshold, the power transmitter 101 will assume that too much power is dissipated in a foreign object and it can then proceed to take action to address such a potential scenario.

Specifically, the power transfer can be terminated when the parasitic power loss estimate PT-PR is larger than a threshold where PT is the transmit power estimate and PR is the receive power estimate.

The measurements may be synchronized between the power receiver and the power transmitter. In order to achieve this, the power receiver can communicate the parameters of a time-window to the power transmitter during configuration. This time window indicates the period in which the power receiver determines the average of the received power. The time window is defined relative to a reference time, which is the time when the first bit of a received power packet is communicated from power receiver to power transmitter. The configuration parameters for this time window consist of a duration of the window and a start time relative to the reference time.

When performing this power loss detection, it is important that the power loss is determined with sufficient accuracy to ensure that the presence of a foreign object is detected.

Firstly, it must be ensured that a foreign object that absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate not to result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected. Conversely, if the power receiver underestimates the received power, this may lead to false detections where the power transmitter terminates the power transfer despite no foreign objects being present.

Thus, simply overestimating the received power—which would result in a perceived power loss that is too low—is not acceptable, due to the increased likelihood that foreign objects will not be detected (false negatives). Underestimating the received power would result in a positive perceived power loss, and is not acceptable as this would lead to detections indicating that a foreign object is present despite there not being any (a false positive). Therefore, only a narrow band is available for any uncertainty in the estimates.

Obviously, the occurrence of numerous false positives is detrimental to the popularity of the power transfer system approach. For example, the average consumer will not understand why their devices are not being charged, or e.g. why their devices charge flawlessly on one power transmitter, but refuse to charge on another. However, false negatives may potentially be even more disadvantageous as it could as a worst case result in foreign objects being heated to a degree where they may cause significant problems.

In order to address this issue and to provide a more accurate foreign object detection, it has been proposed that the power transmitter and the power receiver are calibrated to each other such that the specific characteristics of the individual power receiver and power transmitter are reflected in the foreign object detection. An example of this is provided in European patent application EP12 188 672.5, which discloses a system wherein power transfer is allowed only for low power levels between a power transmitter and power receiver pairing that has not been previously calibrated with each other. However, if the user performs a calibration of the power transmitter and power receiver pairing resulting in a more accurate foreign object detection, the system allows power transfers at higher power levels.

However, whereas such an approach may provide desirable operation in many embodiments, it may be suboptimal in some scenarios. Indeed, the approach requires that calibration must be performed for all power transmitter and power receiver pairings before higher power level power transfers can be performed, even if such calibration is not necessary. For example, for many power receiver and power transmitter combinations, the resulting transmit power and receiver power estimates may be very accurate resulting in a sufficiently reliable foreign object detection even at higher power levels and without any calibration. Calibrations are often inconvenient to a user and often require manual inputs and dedicated calibration modes.

However, the system of FIG. 1 uses a different approach that may allow improved operation, and which in particular may allow improved foreign object detection performance. Specifically, the system of FIG. 1 can operate in both a test mode of operation and a power transfer mode of operation with a form of foreign object detection and/or parasitic power loss detection being performed in both modes. However, when operating in the test mode of operation, at least one operating parameter of the power receiver is restricted relative to the operation in the power transfer mode of operation. Specifically, the power loading of the wireless inductive power signal by the power receiver 105 may be restricted to be below a threshold, and typically to a specific (low) level. This may for example be achieved by the power receiver 105 disconnecting the load when operating in the test mode.

The foreign object detection performed during the test mode may, as a result of this constraint, provide a much more reliable and/or accurate estimate of whether a foreign object is present or not. For example, as previously mentioned, detecting a power loss in a foreign object is much more difficult for high power loads than for low power loads as power load variations of even a few percent may mask the power drain from a foreign object. E.g. as for the previous example, an uncertainty of ±3% can lead to an error of ±1.5 W at 50 W. Therefore, by restricting the power receiver 105 to low loads, say of less than a few Watts, the uncertainty of the load on the wireless inductive power signal by the power receiver can be kept to low levels, thereby allowing an accurate detection of whether any power is dissipated in foreign objects.

In the system of FIG. 1, the power receiver 105 and the power transmitter 101 enter a test mode of operation during initialization of a power transfer operation, with a foreign object detection being performed in the test mode. As an example, the identification and configuration phase may correspond to such a test mode of operation/test phase, i.e. the system may perform a foreign object detection during the identification and configuration phase. As another example, the ping phase may alternatively or additionally correspond to the test mode. As yet another example, in some embodiments even the selection phase, in which the power receiver is not even awake yet (because of the lack of a large enough power signal), may correspond to the test mode.

In other embodiments, the test mode may be implemented as a separate test phase being performed as part of the initialization of a power transfer operation.

If the foreign object detection performed in the test mode indicates that a foreign object is present, the system will not proceed to the power transfer phase. Instead, it may continue under the assumption that a foreign object is present, and may e.g. proceed to generate a user alert or simply wait until a foreign object is no longer detected.

If the test indicates that no foreign object is present, the system will proceed to enter the power transfer phase and both the power transmitter and power receiver will enter a power transfer mode of operation. Thus, the power transfer mode may specifically correspond to the power transfer phase.

In this mode of operation, the power receiver 105 is not constrained as in the test mode, and it may accordingly e.g. increase the power consumption to higher levels. However, the system proceeds to perform parasitic power loss detection in the power transfer mode and thus continues to check if e.g. a foreign object is present.

However, as the power transfer mode is only entered if the more accurate foreign object detection of the test mode has indicated that no foreign object is present, the system can assume with high probability that the power transfer mode is initialized without there being any foreign object present. Accordingly, it can be considered safe to initialize the power transfer phase at increased power.

Furthermore, as it can be assumed that the initial scenario when entering the power transfer mode corresponds to no foreign object being present, the parasitic power loss detection of the power transfer mode can be based on a consideration of the initial characteristics. For example, a relative rather than absolute parasitic power loss detection can be performed, e.g. by detecting an unacceptable parasitic power loss to have occurred if the difference between the transmitted and received power increases by more than a given percentage over the difference at the start of the power transfer mode. In some embodiments, the difference may be compared to a threshold which is dependent on the initial conditions. For example, a predetermined threshold level may be modified dependent on the power difference when entering the power transfer mode (e.g. a threshold may be set at, say, twice the original level).

Indeed, the system may initialize an adaptation/calibration of the parasitic power loss detection at the beginning/initialization of the power transfer mode. This calibration may e.g. be terminated after a given duration or when a specific event occurs. Thus, the calibration of the parasitic power loss detection during the power transfer mode may be based on values of operating parameters (specifically receiver and transmit power estimates) during an initial time window. Thus, the calibration may be based on initial characteristics when entering the power transfer mode and due to the prior accurate foreign object detection, these characteristics can be considered to reflect a scenario with no foreign object being present (otherwise the power transfer mode had not been entered).

Furthermore, if a parasitic power loss is detected during the power transfer mode, the system does not necessarily need to terminate the entire process or require a user input. Rather, if a detection indicates that a parasitic power loss may be too high (e.g. by the measured power difference/loss exceeding a threshold), the system may return to the test mode. In this mode, the power receiver operation is constrained thus allowing an accurate foreign object detection. If this detection also indicates that a foreign object is present, the system may terminate power transfer and e.g. may generate a user alert. In some embodiments, the system may simply remain in the test mode (and e.g. indicate that it is in the test mode) until the foreign object detection indicates that the foreign object is no longer present.

If the foreign object detection in the test mode indicates that no foreign object is present, the system may instead return to the power transfer mode. In this case, the system may accordingly increase the power and resume normal power transfer.

Thus, the approach may allow a substantially more accurate foreign object detection and may in particular allow an advantageous interworking between a power transfer mode parasitic power loss detection which is less accurate and a test mode foreign object detection which is more accurate. The approach allows for a more advantageous user experience.

In particular, the approach may enable the power transfer signal to automatically recover from potential interruptions or undesirable situations without requiring explicit user input or action. For example, if a foreign object is accidentally positioned close to the power transmitter 101, this can be detected and result in a power reduction to safe levels. However, when the foreign object is removed, the system can automatically restart the power transfer operation.

The approach may e.g. in many embodiments allow the parasitic power loss detection to be set more aggressively to result in a higher probability of detecting foreign objects but also with an increased chance of false detections (a detection of a foreign object when no foreign object is actually present). However, as a false detection may only result in the system entering the test mode where the more accurate foreign object detection will indicate that no foreign object is present, and the system will accordingly quickly return to the power transfer mode. Thus, a false detection will only result in a short interruption in the power transfer.

In the system, the foreign object detection is based on an assumption of the power receiver being in a test mode wherein at least one operating parameter of the power receiver, typically a loading of the wireless inductive power signal, is constrained with respect to when the power receiver is in the power transfer mode. Thus, the foreign object detection in the test mode is based on an expected load for the power receiver when this is in the test mode, i.e. when the loading of the wireless inductive power signal is constrained. However, the parasitic power loss detection which is performed in the power transfer phase is not based on the assumption of the power receiver operating with a constrained operating parameter, and specifically is not based on the expected load of the wireless inductive power signal when the power receiver is operating in the test mode. Accordingly, the parasitic power loss detection must accommodate for a much larger operating range and therefore the parasitic power loss detection will tend to be much more inaccurate than the foreign object detection.

For example, when in the test mode, the loading of the wireless inductive power signal by the power receiver may correspond to the loading that results from a power receiver when operating in a test mode where no power is provided to the external power receiver load. Thus, the loading of the wireless inductive power signal may correspond to only the loading resulting from eddy currents being induced in metallic parts of the power receiver and to the potential powering of the internal electronics. Thus, a very low loading of the wireless inductive power signal is expected in this test mode. Any additional power dissipation in foreign objects will accordingly represent a high proportion of the total power dissipation and accordingly will be easy to detect.

In contrast, when the system is operating in the power transfer phase, the power receiver is providing power to the external load. This power may be very substantial, and may typically be substantially higher than the power which is likely to be induced in any foreign objects present. Accordingly, the detection of a foreign object is much more difficult and will be substantially less reliable in the power transfer phase than when the system is operating in the test mode.

In order to improve the accuracy of the parasitic power loss detection in the power phase, the parasitic power loss detection is in the system calibrated/adapted dynamically. Specifically, the system is arranged to adapt a first parameter of the parasitic power loss detection in response to operating parameter values when the system is in the power transfer phase. Specifically, the system may adapt a parameter of the calculation of the power loss estimate and/or of the detection threshold in dependence on at least one of transmit power estimates and receive power estimates. However, rather than continuously adapting the parasitic power loss detection, the adaptation is restricted to only be based on operating parameter values (specifically on receive/transmit power estimates) that are received in any initial time interval of the power transfer phase. Thus, only operating parameter values generated for an initial time interval are considered when adapting the parasitic power loss detection. After the initial time interval has ended, the system may continue in the power transfer phase but without the operating parameter values for these times being used to adapt the parasitic power loss detection. Thus, in the approach the system is arranged to exclude from the adaptation operating parameter values that reflect conditions at times which are part of the power transfer phase but which are outside the initial time interval.

A substantial advantage of the approach is that the adaptation of the parasitic power loss detection allows for much more accurate operation and allows not only the parasitic power loss detection to be adapted to the specific power transmitter and power receiver, but in many embodiments also allows it to be adapted to the specific current conditions (including e.g. current power levels in the power transfer phase). Furthermore, by restricting the adaptation to be based on operating parameter values that reflect the power transfer during the initial time interval (but not on operating parameter values that reflect operating conditions thereafter), the adaptation is restricted to reflect the conditions directly following an accurate detection that no foreign object is present. Thus, the adaptation is based on the conditions which are present during a time where the risk of a foreign object being present is very low. Accordingly, the risk that the parasitic power loss detection is adapted to reflect a scenario wherein a foreign object is present can be substantially reduced.

The approach accordingly utilizes an approach where two detections which are based on different assumptions/operating scenarios, and which have different detection accuracies, interact to improve the overall detection performance. Significantly, the accuracy and performance of the less accurate (but often more important) detection during the power transfer phase can be substantially improved.

Figure 2:
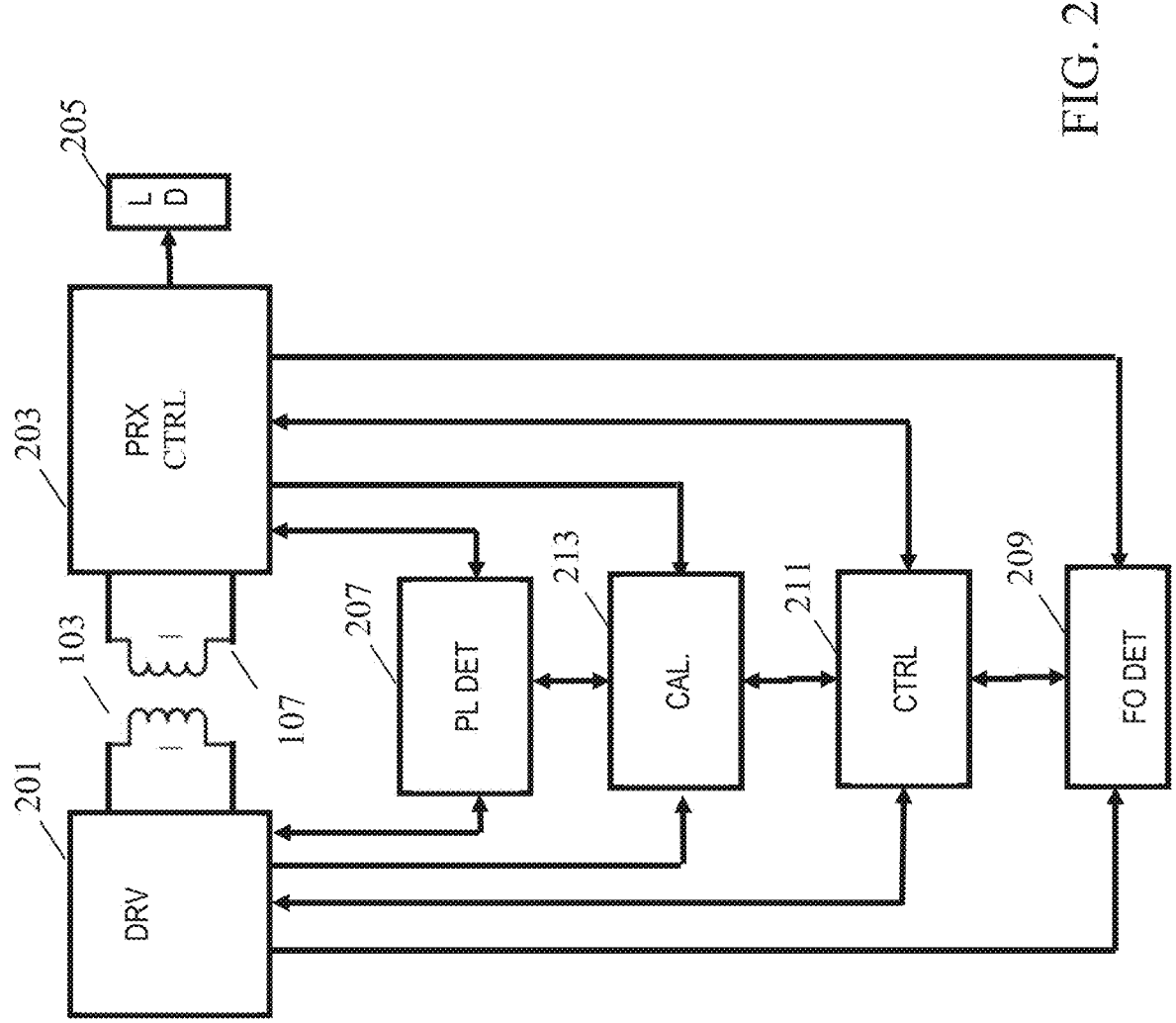
FIG. 2 illustrates an example of elements of a power transfer system in accordance with some embodiments of the invention.

FIG. 2 illustrates the system FIG. 1 in more detail.

FIG. 2 illustrates a driver 201 which is coupled to the transmit coil 103 and which generates the power signal and provides this to the transmit coil 103. Thus, the driver 201 provides the wireless inductive power signal to the power receiver 105 via the transmit coil 103 (and the receive coil 107).

Figure 3:
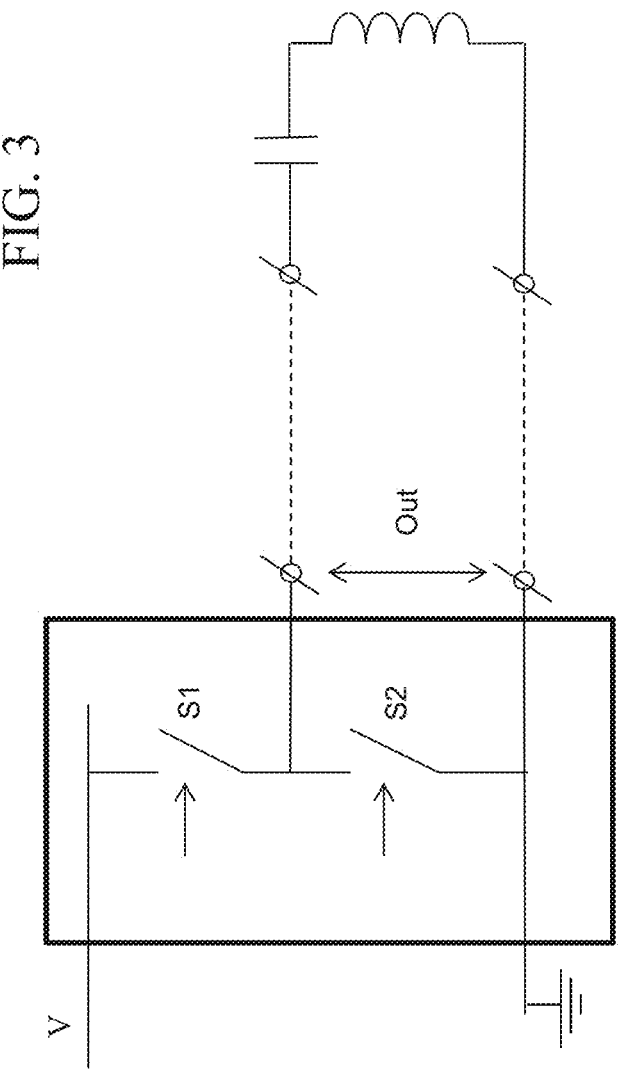
FIG. 3 illustrates an example of elements of a half-bridge inverter for a power transmitter in accordance with some embodiments of the invention.
Figure 4:
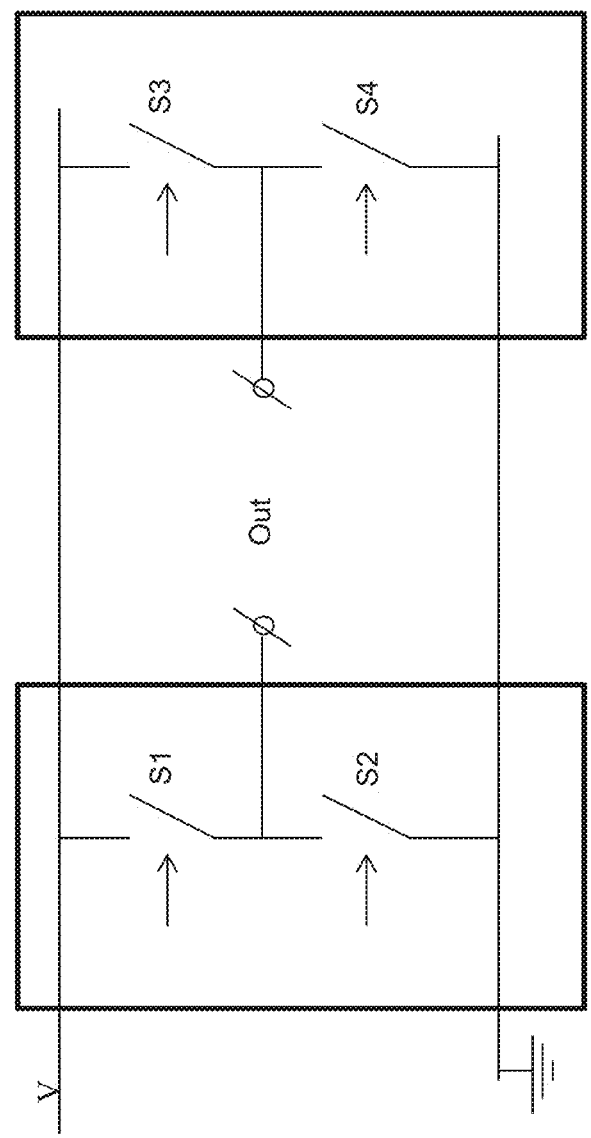
FIG. 4 illustrates an example of elements of a full-bridge inverter for a power transmitter in accordance with some embodiments of the invention.

The driver 201 generates the current and voltage which is fed to the transmitter coil 103. The driver 201 is typically a drive circuit in the form of an inverter which generates an alternating signal from a DC Voltage. FIG. 3 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a block-wave signal at the output. The switches are open and closed with the desired frequency.

The driver 201 also comprises control functionality for operating the power transfer function and may specifically comprise a controller arranged to operate the power transmitter 101 in accordance with the Qi standard. For example, the controller may be arranged to perform the Identification and Configuration as well as the power transfer phases of the Qi standard.

The receiver coil 107 is coupled to a power receiver controller 203, which comprises various functionality for operating the power transfer function, and is in the specific example arranged to operate the power receiver 105 in accordance with the Qi standard. For example, the power receiver 105 may be arranged to perform the Identification and Configuration as well as the power transfer phases of the Qi standard.

The power receiver controller 203 is arranged to receive the power signal and to extract the power during the power transfer phase. The power receiver controller 203 is coupled to a power load 205 which is the load powered from the power transmitter 101 during the power transfer phase. The power load 205 may be an external power load but is often part of the power receiver device, such as a battery, display or other functionality of the power receiver (e.g. for a smart phone the power load may correspond to the combined functionality of the smart phone).

The system further comprises a detector, henceforth referred to as the parasitic power loss detector 207, which is arranged to generate a parasitic power loss detection for the power transfer in response to a parasitic power loss estimate being outside a range. Specifically, the parasitic power loss detector 207 may generate a parasitic power loss estimate indicative of a power difference between a transmit power estimate for the power transmitter 101 and a receive power estimate for the power receiver 105, and to detect if the difference between these fall outside a range.

For example, the parasitic power loss detector 207 may consider a transmit power estimate generated by the power transmitter 101.

As a simple example, the transmit power estimate may be determined as the power which is fed to the transmitter coil 103 or may e.g. be determined as the input power to the inverter stage of the driver 201. For example, the power transmitter 101 may measure the current through the transmitter coil 103, the voltage over the transmitter coil 103 and the phase difference between the voltage and current. It can then determine the corresponding (time averaged) power based on these values. As another example, the supply voltage of the inverter is typically constant, and the power transmitter 101 may measure the current drawn by the inverter and multiply this by the constant voltage to determine the input power to the inverter. This power may be used as the transmit power estimate.

In many embodiments, a slightly more complex transmit power estimate is generated. In particular, the approach may compensate the calculated power for losses in the power transmitter 101 itself. In particular, losses in the transmitter coil 103 itself may be calculated, and the input power may be compensated by this value to provide an improved indication of the power, which is transmitted from the transmitter coil 103.

The power loss in the transmitter coil 103 may be calculated as:

$$P_{losscoil} = R \cdot I_{coil}^2$$

where $I_{coil}$ is the rms current through the transmitter coil 103 and R is the equivalent resistance of the transmitter coil 103. Assuming the resistance is known, the transmitted power may be estimated by:

$$P_{tx} = V_{coil} \cdot I_{coil} \cdot \cos(\varphi) - R \cdot I_{coil}^2$$

where $V_{coil}$ is the voltage over the transmitter coil 103 and $\Phi$ is the phase between $V_{coil}$ and $I_{coil}$.

R may depend on the frequency of the transmitter coil current, e.g. according to a function such as: $R = R_b \cdot R_f \cdot f$, where $R_b$ is the frequency independent part of the equivalent resistance, $R_f$ is the frequency dependent part of the equivalent resistance, and f is the frequency.

Further, the parasitic power loss detector 207 may consider a receive power estimate generated by the power receiver 105.

The receive power estimate may directly be estimated as the power that is provided to the load of the power receiver 105. However, in many embodiments, the power receiver 105 will generate a receive power estimate which also includes power loss/dissipation in the power receiver 105 itself. Thus, the reported received power indication may include both power provided to the load as well as power loss in the power receiver 105. For example, it may include measured or estimated power loss in the rectification circuits and/or the receiver coil. In many embodiments, the receive power estimate may also include estimates of power dissipated in e.g. conductive parts of the power receiver enclosure.

Typically time averaged values are used, e.g. with the power values being determined as average values in suitable time intervals, with the time intervals preferably being synchronized between the power transmitter 101 and the power receiver 105.

The parasitic power loss detector 207 may subtract the receive power estimate from the transmit power estimate to determine the parasitic power loss estimate. The parasitic power loss estimate is an estimate of the amount of power that is not dissipated or consumed by the power receiver 105 (including the power provided to the load 205). Thus, the parasitic power loss estimate can be considered to be an estimate of power that is consumed by other devices than the power receiver 105 (or the power transmitter 101). Thus the parasitic power loss estimate is an estimate of losses that may occur in other entities, such as foreign objects positioned near the transmit coil 103. The parasitic power loss estimate may specifically be a foreign object estimate.

The parasitic power loss detector 207 is arranged to generate a parasitic power loss by evaluating if the parasitic power loss estimate meets a parasitic power loss criterion corresponding to the parasitic power loss estimate being outside a range. In many embodiments, the criterion may be that the parasitic power loss estimate exceeds a given detection threshold which may be a predetermined threshold. Accordingly, in some embodiments, the parasitic power loss detector 207 may simply compare the difference between the transmit power estimate and the receive power estimate to a given threshold and indicate that a parasitic power loss has been detected if the threshold is exceeded. This may indicate that the loss in a foreign object may be too high and that there is a potential risk of an unwanted heating of a foreign object.

The system furthermore comprises another detector, henceforth referred to as the foreign object detector 209, which is arranged to generate a foreign object detection estimate in response to a comparison of a measured load of the wireless inductive signal to an expected load of the wireless inductive power signal when the power receiver is operating in the test mode.

The foreign object detection estimate may specifically be a binary estimate which indicates whether it is estimated that a foreign object is present or not, i.e. whether a foreign object has been detected or whether a foreign object has not been detected.

The foreign object detector 209 operates in the test mode and accordingly the foreign object detection is based on the power receiver operating with a constrained operating parameter. Thus, the foreign object detection can assume that the operation of the power receiver 105 is within a typically very narrow operating range which may assist the detection of the foreign object.

Specifically, the power receiver 105 may be constrained to operate with a loading of the wireless inductive power signal which is constrained relative to the operation when in the power transfer phase. This may in many embodiments be achieved by the power receiver having a predetermined and fixed power drain. Specifically, in many embodiments, the power receiver 105 may be constrained to a fixed and predetermined load. For example, rather than the power receiver 105 providing power to the load 205 (which typically varies dynamically), the load 205 may be disconnected when the power receiver 105 is in the test mode. The power receiver 105 may instead be connected to a fixed and predetermined test load, or may in some embodiments not be connected to any load, when in the test mode.

The foreign object detection may accordingly be based on more specific knowledge of the power receiver's 105 operating point. Furthermore, the operating point may be selected to facilitate the foreign object detection. This may in many scenarios specifically be achieved by selecting a relatively low and constant loading of the power receiver 105.

In some embodiments, the power receiver 105 may provide a predetermined and low loading of the wireless inductive power signal, and the foreign object detection may simply correspond to a detection of whether the transmit power exceeds a threshold or not. Thus, if the transmit power exceeds a given threshold when in the test mode, a binary foreign object detection estimate may be set to indicate that a foreign object has been detected and otherwise it may be set to indicate that a foreign object has not been detected. In some embodiments, the measured transmit power may directly be used as a foreign object detection estimate.

In some examples, a similar approach to that of the parasitic power loss detection may be performed, i.e. the difference between a transmit power and a receive power may be compared to a threshold. If the difference exceeds the threshold, the foreign object detection estimate may indicate that a foreign object has been detected, and otherwise it may indicate that a foreign object has not been detected.

Thus, as an example, the power receiver may enter a test mode with pre-defined conditions. Specifically, the power receiver can disconnect its target load and instead be connected to an accurate pre-defined load, e.g. formed by a relatively high precision resistor.

The power receiver can accordingly more accurately determine the power consumption of this load. For example, it would be sufficient to e.g. only measure the voltage on the predetermined load, and it would not be necessary to measure the current through the load, or to consider any phase differences between current and voltage. In addition, the power receiver 105 may set the voltage on the test load to a predefined level. This results in a predefined current through the load, and also in a predefined current through the rectifier and the receiver coil. This allows for the power loss in the receiver inductor 107 and the rectifier to be determined more accurately.

Accordingly, the test mode allows for a very accurate determination of the power extracted by the power receiver 105, and thus of the loading of the wireless inductive power signal. Accordingly, due to the predefined load condition, the power receiver 105 can more accurately determine the received power. The receive power estimate can be provided to the foreign object detector 209. In addition, the power transmitter 101 can typically determine the transmit power with a relatively high accuracy, and a transmit power estimate can accordingly be provided to the foreign object detector 209. This may then determine the difference and compare it to a detection threshold.

The parasitic power loss detector 207 and the foreign object detector 209 are coupled to a controller 211 which is also coupled to the power receiver 105 and the power transmitter 101. It will be appreciated that the controller 211 may be part of the power transmitter 101, part of the power receiver 105, or e.g. distributed between these. It will also be appreciated that the couplings between different functional entities may be via suitable communication links as appropriate, including for example (bidirectional) communication between the power receiver 105 and the power transmitter 101 via the wireless inductive power signal.

The controller 211 interfaces with the foreign object detector 209 and the parasitic power loss detector 207 and can receive information from these. Specifically, the controller 211 may receive foreign object detection estimates from the foreign object detector 209 indicative of whether the foreign object detector 209 has detected a foreign object or not (during test mode operation). Similarly, it receives parasitic power loss detection estimates from the parasitic power loss detector 207 indicative of whether a parasitic power loss has been detected by the parasitic power loss detector 207 (during power transfer mode operation).

The controller 211 can further control the operation of the power transfer system and can specifically directly or indirectly (e.g. via suitable communication links) control the mode in which the power receiver 105 and the power transmitter 101 operate in, and specifically whether they operate in the test mode or in the power transfer mode. It can specifically also control whether the parasitic power loss detector 207 and the foreign object detector 209 operate in the test mode or in the power transfer mode. Specifically, it can control whether the parasitic power loss detector 207 and the foreign object detector 209 are active or not (or equivalently e.g. whether the detection outcomes are ignored or acted upon).

The controller 211 may specifically initialize the system to operate in the test mode e.g. as part of an initialization of a power transfer. Thus, the power receiver 105 and the power transmitter 101 are entered into the test mode. Typically, the foreign object detector 209 is part of the power transmitter 101 or the power receiver 105 and accordingly the foreign object detector 209 is also entered into the test mode. Alternatively, in some embodiments, the foreign object detector 209 may be entered into the test mode directly by the controller 211 (or the controller 211 ignores the results of any tests performed by the foreign object detector 209).

When the system is in the test mode, the foreign object detector 209 generates foreign object detection estimates which indicate whether there is a foreign object present or not. The controller 211 receives these estimates and in response determines whether the system should enter the power transfer mode or not. Specifically, if received foreign object detection estimates meet a criterion that indicates that no foreign object is detected, the controller 211 proceeds to enter the power transfer system into the power transfer mode of operation. Otherwise, it remains in the test mode.

Thus, when a foreign object detection estimate indicative of no foreign object being present is received by the controller 211 from the foreign object detector 209, it proceeds to switch the power receiver 105 and the power transmitter 101 into the power transfer mode. In response, the power transmitter 101 enters a mode wherein power above the low value used in the test mode is generated (if requested). Similarly, the power receiver 105 connects to the load and a proper power transfer begins.

Furthermore, in the power transfer mode, the foreign object detector 209 proceeds to evaluate whether a parasitic power loss exceeds a given value. If so, there may be a foreign object present and thus a potentially undesirable scenario may have occurred. Accordingly, the system may proceed to take action.

In some embodiments, such a parasitic power loss detection may for example directly result in the power transfer being terminated.

However, in the example of FIG. 2, the controller 211 receives the indication of the parasitic power loss detection from the parasitic power loss detector 207, and in response it proceeds to switch the power transmitter 101 and the power receiver 105 from the power transfer mode into the test mode (in some embodiments, the controller 211 may only switch one of the power transmitter 101 and the power receiver 105 into the test mode, with this entity then e.g. switching the opposite device into the test mode).

Thus, in the system of FIG. 2, a parasitic power loss detection does not result in the entire power transfer operation being abandoned but merely results in the power transfer system being entered into a test mode. The controller 211 may then proceed to evaluate the foreign object detection estimates. If these indicate that a foreign object is detected, the system may remain in the test mode (continuing to evaluate if a foreign object is detected). If no foreign object is detected (either directly when the test mode is entered or after some time), the controller 211 may again enter the system into the power transfer mode.

Thus, the system may be able to recover after a possible detection of a foreign object. Furthermore, this recovery is not only safe and reliable but can be performed without requiring user intervention.

The system is based on detections of foreign objects/parasitic power losses both when the system is in the test mode and in the power transfer mode. However, when in the test mode, the operating parameters of the power receiver 105 are constrained thereby allowing a substantially more accurate and reliable detection to be performed. The two detection algorithms may be substantially the same (such as an evaluation of a power difference between estimated/measured transmitted and received power) but based on different operating conditions, or may indeed be very different detection algorithms.

The system of FIG. 2 furthermore comprises a calibration unit 213 which is arranged to adapt/calibrate the parasitic power loss detection. Specifically, the calibration unit 213 adapts one or more parameters of the parasitic power loss detection in response to operating parameter values, such as for example receiver power estimates and/or transmit power estimates. However, rather than adapt continuously, the calibration unit 213 is arranged to adapt the parasitic power loss detection based on operating parameter values determined in an initial time interval of entering the power transfer phase.

Specifically, when the controller 211 determines that the foreign object detector 209 has indicated that no foreign object is present and that the power transfer phase should be entered, it also proceeds to initialize a time interval (or time window). The system proceeds to determine one or more operating parameter values that reflect the operating conditions within this initial time interval, and the calibration unit 213 then adapts the parasitic power loss detection based on these operating parameters. However, the calibration unit 213 is furthermore arranged to exclude operating parameter values that are determined during the power transfer phase but outside of the initial time interval. Thus, the calibration unit 213 is arranged to exclude or discard operating parameter values that are determined outside of the initial time interval.

For example, when the controller 211 initializes the transition into the power transfer phase of the power transmitter 101 and/or the power receiver 105, it also initializes the calibration unit 213 to begin the initial time interval. Accordingly, the calibration unit 213 proceeds to obtain operating parameter values that are used for adapting the parasitic power loss detection. At the end of the initial time interval, the system remains in the power transfer phase but the parasitic power loss detection is not adapted based on operating parameter values obtained after the end of the initial time interval. Thus, in the system, operating parameter values of the power transfer phase are only used to adapt the parasitic power loss detection when they belong to the initial time interval and not if they occur outside of this.

Thus, in many embodiments, the calibration unit 213 may discard or reject (or prevent the generation of) operating parameter values outside the initial time interval when determining operating parameter values for adaptation.

In the system, the operating parameter values that are used for adaptation are accordingly restricted to an initial time interval which follows the foreign object detection indicating that no foreign object is present. Accordingly, during the initial time interval, there is a very high probability that the conditions of the power transfer phase reflect a scenario with no foreign object present, and accordingly the adaptation based on the operating parameter values in the initial time interval will correspond to an adaptation to a scenario with no foreign object present. As the adaptation is to this scenario, the reliability of detecting deviations from this scenario, i.e. the reliability of detecting that a foreign object is present, can be increased substantially.

The risk of a foreign object being present during the power transfer phase increases as the time since the last evaluation by the foreign object detector 209 increases, i.e. the longer the duration since the foreign object detector 209 generated a foreign object detection estimate indicative of there being no detection of a foreign object, the higher the risk that a foreign object may have entered the vicinity of the power transfer. However, in the approach, the adaptation of the parasitic power loss detection is based only on (power transfer) operating parameter values within the initial time interval of the power transfer, and thus the risk of an adaptation based on "wrong" parameters (i.e. a scenario where a foreign object is present) is substantially reduced.

The approach uses the result of the accurate foreign object detection to control the adaptation of the less accurate parasitic power loss detection. The interaction between two detections being performed in different scenarios (under different constraints) results in improved foreign object detection and reduced risk of e.g. power loss in foreign objects.

In the system, the calibration unit 213 is thus arranged to exclude from the adaptation operating parameter values for times outside of an initial time interval of entering the power transfer phase. In many embodiments, this may be achieved by continuously performing the adaptation based on operating parameter values during the initial time interval and terminating the adaptation at the end of the initial time interval. Thus, in such embodiments, the adaptation effectively operates in real time where operating parameter values are generated based on current measurements and are immediately used to perform the adaptation. Thus, the adaptation is restricted to the initial time interval and is terminated at the end of the initial time interval.

However, it is noted that in other embodiments, the adaptation may alternatively or additionally be performed at another time including e.g. during the power transfer phase after the initial time interval, or indeed during a subsequent time when the system has entered another phase, such as e.g. when operating in the test mode. However, in these embodiments, the calibration unit 213 still excludes (at least some) operating parameter values determined during the power transfer phase if these are outside of the initial time interval. Thus, in such non-real time adaptation embodiments, the operating parameter values during the initial time interval may e.g. be stored for later use and the adaptation may be based on these stored values and not on current operating parameter values.

The operating parameter values within the initial time interval may specifically be operating parameter values that are determined based on measurements performed within the initial time interval. For example, a transmit power estimate may be determined based on measurements of the transmit inductor current, and only transmit power estimates generated from measurements of the transmit inductor current within the initial time interval are used. Similarly, a receive power estimate may be determined based on measurements of the receive inductor current, and only receive power estimates generated from measurements of the receive inductor current within the initial time interval are used. However, any operating parameter values that are generated based on measurements within the power transfer phase but outside of the initial time interval are not used in the adaptation.

In some embodiments, the duration of the initial time interval may be predetermined, e.g. the initial time interval may last for, say, 10 seconds after the initialization of the power transfer phase/the detection that no foreign object is present. In other embodiments, the end of the initial time interval may additionally or alternatively be dependent on operating characteristics, such as e.g. the loading of the wireless inductive power signal. It will be appreciated that the different functional blocks of FIG. 2 can be performed in different entities, and indeed that they can typically be implemented in the power receiver 105, the power transmitter 101, or externally to both the power receiver 105 and the power transmitter 101; or indeed can be distributed between these locations. It will also be appreciated that various communication of measurements, commands, detection results etc. may be used to support such implementations.

For example, each of the individual connections of FIG. 2 between the driver 201 and the foreign object detector 209, the parasitic power loss detector 209, the controller 211, and the calibration unit 213 may be implemented by an internal communication link if the individual entity is part of the power transmitter 101, and by an external communication link (e.g. using the wireless inductive power signal as a communication carrier or using a separate communication approach such as Bluetooth or NFC communication) if the individual entity is part of the power receiver 105 or of a separate device external to both the power receiver 105 and the power transmitter 101.

Similarly, each of the individual connections of FIG. 2 between the power receiver controller 203 and the foreign object detector 209, the parasitic power loss detector 209, the controller 211, and the calibration unit 213 may be implemented by an internal communication link if the individual entity is part of the power receiver 105, and by an external communication link (e.g. using the wireless inductive power signal as a communication carrier or using a separate communication approach such as Bluetooth or NFC communication) if the individual entity is part of the power transmitter 101 or of a separate device external to both the power receiver 105 and the power transmitter 101.

In many embodiments, the parasitic power loss detector 207, the foreign object detector 209 and the calibration unit 213 may be implemented in the power transmitter 101. This typically allows for a lower complexity, and often a safer operation. It may facilitate operation, e.g. by reducing the communication required from the power transmitter 101 to the power receiver 105.

In many systems, the controller 211 may be located in the power receiver 105. For example, for the Qi system, it is a design philosophy that as much as possible of the control is located in the power receiver 105 rather than in the power transmitter 101.

Figure 5:
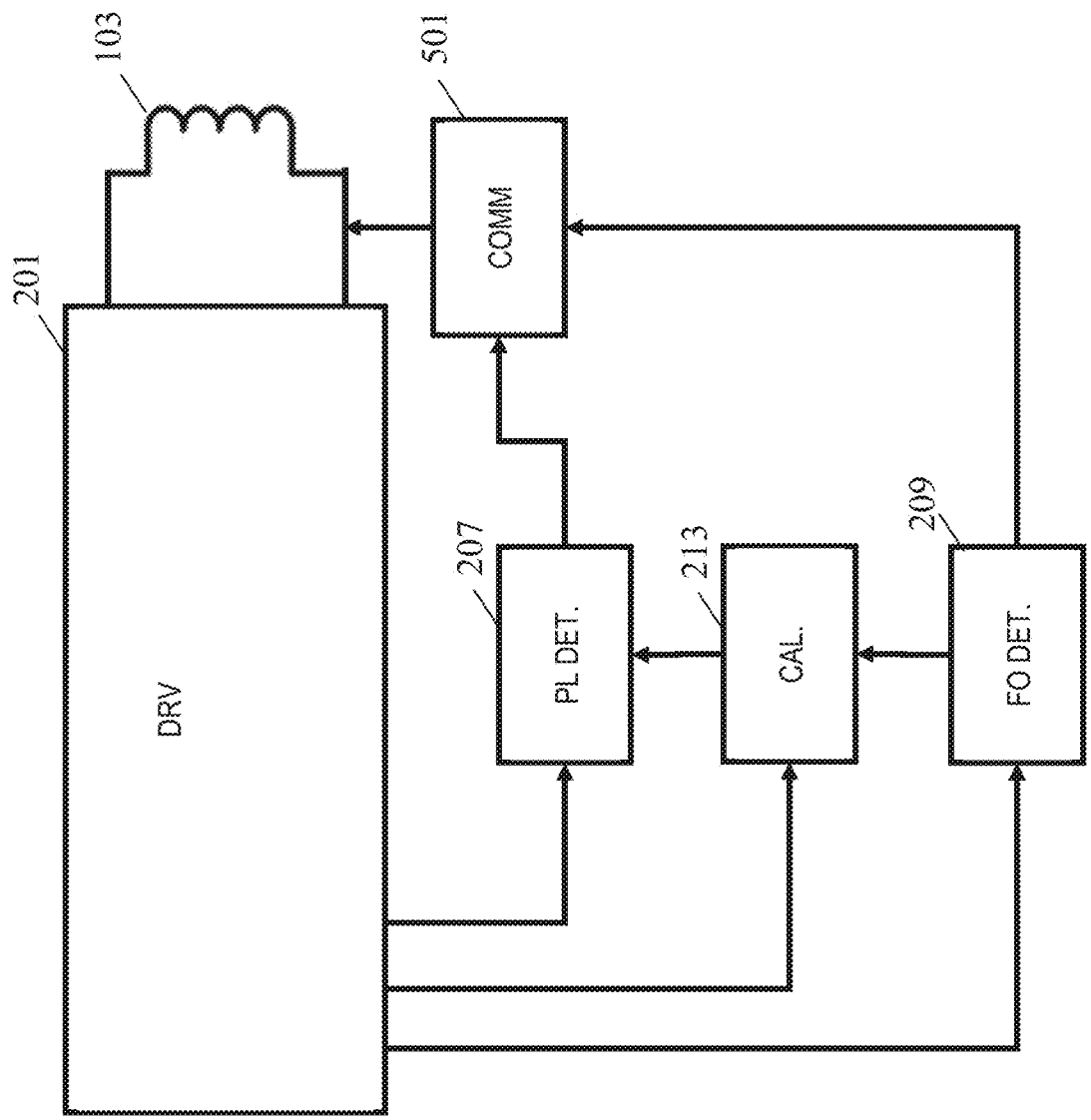
FIG. 5 illustrates an example of elements of a power transmitter in accordance with some embodiments of the invention.

FIG. 5 illustrates and example of a power transmitter 101 in accordance with such an embodiment. Thus, the power transmitter 101 comprises the parasitic power loss detector 207, the calibration unit 213, and the foreign object detector 209. In addition, FIG. 5 illustrates a power transmitter communicator 501 which can transmit and receive data to and from the power receiver 105.

Figure 6:
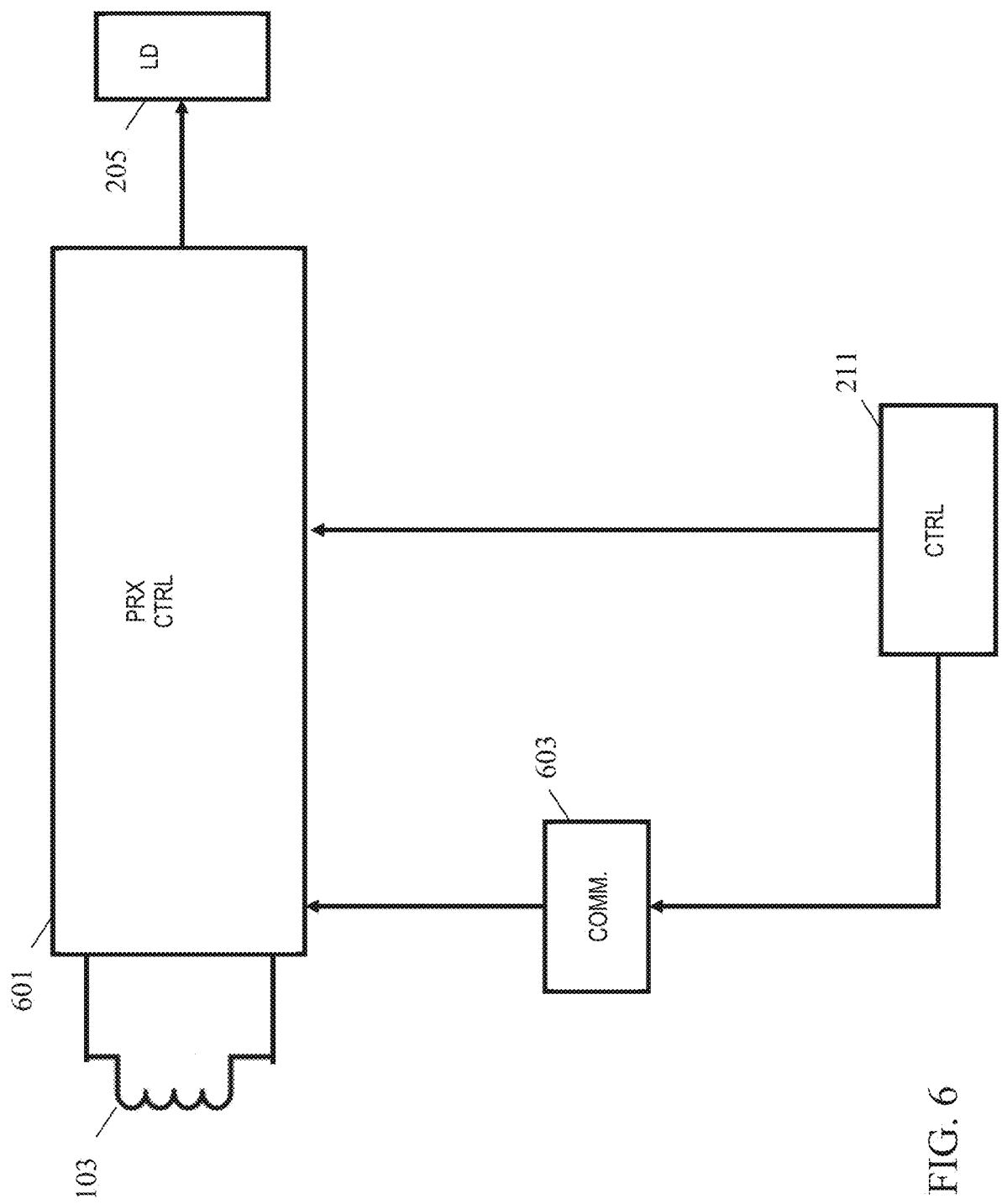
FIG. 6 illustrates an example of elements of a power receiver in accordance with some embodiments of the invention.

Correspondingly, FIG. 6 illustrates an example of a power receiver 105 in accordance with such an embodiment. The power receiver 105 comprises a power receiver processor 601 which receives and extracts power from the wireless inductive power signal and provides it to the load 205 as will be known to the skilled person. In addition, the power receiver processor 601 comprises the various control functionality required for operating the power receiver 105, e.g. in accordance with the Qi standard (the power receiver processor 601 of FIG. 6 may correspond to the power receiver controller 203 of FIG. 2).

In the example, the power receiver 105 comprises the controller 211. In addition, FIG. 6 illustrates a power receiver communicator 603 which can transmit data to, and receive data from, the power transmitter 101.

In many embodiments, the power receiver 105 is arranged to transmit a test mode initiation command to the power transmitter 101 and the power transmitter 101 may enter the test mode in response to receiving the test mode indication. In connection with sending the test mode initiation command, the power receiver 105 will also itself enter the test mode. Thus, in such embodiments, the power receiver 105 may comprise a controller 211 which controls which mode the system is operating in, and specifically the power receiver 105 can comprise the functionality for deciding when the power transfer system should enter the test mode.

The power receiver 105 may specifically be capable of switching the system into the test mode as part of an initialization of a power transfer. However, the power receiver 105 may additionally or alternatively be arranged to transmit a test mode initiation command to the power transmitter 101 when the system is operating in the power transfer mode/phase. Thus, the power receiver 105 can control the operation and specifically can control whether the power transfer mode is maintained or whether the system switches into the test mode.

The power receiver 105 may for example detect a change in the operating conditions and may in response switch the system into the test mode to evaluate whether a foreign object is likely to be present or not.

Specifically, the power receiver 105 may continuously evaluate how much power is received. If the received power suddenly decreases resulting e.g. in a the power receiver 105 having to send a sequence of power up messages, such a power step could be caused by a foreign object being positioned close to the power transmitter 101. Therefore, in order to evaluate whether this may be the case, the power receiver 105 can proceed to switch the system into the test mode by transmitting a test mode initiation command to the power transmitter 101. Thus, in some embodiments, the power receiver 105 may transmit a test mode initiation command to the power transmitter 101 when detecting a change in the received power.

Alternatively or additionally, the power receiver 105 may be arranged to transmit the test mode initiation command in response to receiving data from the power transmitter 101. Specifically, the power transmitter 101 may transmit an indication of a parasitic power loss detection, and the power receiver 105 may in response switch itself into the test mode, and transmit a test mode initiation command to the power transmitter 101 to switch this to the test mode.

In some embodiments, the power transmitter communicator 501 may be arranged to transmit a test mode request to the power receiver where the test mode request provides a request for the power receiver to enter the test mode. In response to receiving the test mode request, the power receiver 105 proceeds to enter the test mode wherein the loading of the wireless inductive power signal is constrained relative to the loading of the wireless inductive power signal which may occur during the power transfer phase (i.e. when the power receiver is operating in the power transfer mode).

Thus, in such an embodiment, the power transmitter 101 can control when the power receiver 105 operates in the test mode, i.e. it can control when the power receiver is operating with a constrained loading of the wireless inductive power signal. In some embodiments, the power receiver 105 may confirm the receipt and that it has entered (or is entering) the test mode, and the foreign object detector 209 may be arranged to perform the foreign object detection in response to receiving such a confirmation.

wherein the loading of the wireless inductive power signal by the power receiver is constrained relative to the loading of the wireless inductive power signal by the power receiver when operating in the power transfer mode during the power transfer phase.

This may provide efficient and improved operation in many embodiments. In particular, it may allow an efficient approach for aligning the test mode operations of the power transmitter with the power receiver. It may specifically, allow the power transmitter to control the power receiver to enter the test mode wherein a more accurate foreign object detection can be performed based on the loading being constrained.

In some embodiments, the power transmitter 101 may be arranged to transmit a parasitic power loss detection indication to the power receiver 105 when a parasitic power loss is detected by the parasitic power loss detector 207. Thus, during the power transfer phase, the parasitic power loss detector 207 may continuously evaluate whether a parasitic power loss exceeding a threshold is experienced. If so, a parasitic power loss is detected and the power transmitter 101 transmits the parasitic power loss detection indication to the power receiver 105. When receiving the parasitic power loss detection indication, the power receiver 105 may proceed to determine whether it considers that a foreign object may potentially be present. If so, it may switch the system into the test mode by transmitting a test mode initiation command to the power transmitter 101.

In many embodiments, the power receiver 105 may also comprise functionality for determining when the test mode should be exited and/or when the power transfer mode should be entered.

Specifically, the power receiver 105 may be arranged to transmit a test mode termination command to the power transmitter 101, and the power transmitter 101 may enter the power transfer mode in response to receiving this test mode termination command from the power receiver 105. The power receiver 105 may also exit the test mode when transmitting the test mode termination command.

The power receiver 105 may be arranged to transmit the test mode termination command in response to receiving data from the power transmitter 101. For example, when in the test mode, the foreign object detector 209 may continuously generate foreign object detection estimates and these may be transmitted to the power receiver 105. The power receiver 105 may then evaluate these foreign object detection estimates and if a criterion is met, it may decide that the test mode has been successfully completed, and that it is acceptable to proceed to the power transfer mode. If the criterion is met, the power receiver 105 accordingly transmits the test mode termination command to the power transmitter 101 and enters the power transfer mode itself.

Specifically, the power receiver 105 may remain in the test mode for as long as foreign object detection estimates are received which indicate that a foreign object is being detected. However, if foreign object detection estimates are received indicating that there are no foreign objects detected, the power receiver 105 may e.g. after a given number of these have been received, determine that it is reasonable to enter the power transfer mode. In response, it can transmit the test mode termination command and itself enter the power transfer mode.

Thus, in some embodiments, the power transmitter is arranged to transmit at least one foreign object detection estimate to the power receiver. The foreign object detector 209 may for example continuously generate foreign object detection estimates, and the power transmitter 101 may transmit these to the power receiver 105 at regular intervals. The power receiver 105 may accordingly continuously evaluate the foreign object detection estimates and may for example decide that the test mode can be exited when a given number of foreign object detection estimates have been received without indications of foreign objects, or when a given time interval has occurred without any foreign object detection estimate indicating that a foreign object has been detected.

In some embodiments, the power transmitter 101 may only communicate a foreign object detection estimate when it has been detected that a foreign object is present, i.e. only a positive detection foreign object detection estimates may be communicated. In such an embodiment, the power receiver 105 may for example remain in the test phase until a given interval has passed without any foreign object detection estimates being received from the power transmitter 101.

The power receiver 105 and/or the power transmitter 101 may be arranged to exit the test mode and directly enter the power transfer mode. However, in some embodiments, one or more intervening phases or modes may be operated. Also, in some embodiments, the entering of the power transfer mode may be conditional, e.g. on the successful outcome of the intervening phases.

It will be appreciated that various communication approaches may be used for communicating parasitic power loss detections and foreign object detection estimates to the power receiver 105 from the power transmitter 101.

In many embodiments, the communication may be achieved by controlling the transmission of acknowledge messages to messages from the power receiver 105. Specifically, in many embodiments, the power receiver 105 may transmit various messages to the power transmitter 101. Specifically, during the power transfer phase, the power receiver 105 continuously transmits power control (error) messages to the power transmitter 101. The power transmitter 101 may in some embodiments acknowledge such messages, e.g. by a single bit indicating that the message has been acknowledged.

The power transmitter 101 may specifically transmit a parasitic power loss detection indication to the power receiver 105 by not acknowledging a power control loop message received from the power receiver 105. Thus, if the parasitic power loss detector 207 detects a parasitic power loss, and thus potentially a foreign object, it may proceed to not acknowledge the power control loop message (i.e. the power control (error) message) to indicate the detection. The non-acknowledge may for example be communicated by transmitting a dedicated non-acknowledge bit, or in some embodiments simply by not communicating the acknowledge bit.

A corresponding approach may be used to communicate a foreign object detection estimate. For example, the power transmitter 101 may be able to respond to the test mode initiation command by transmitting a message to the power receiver 105 indicating whether a foreign object is detected or not. The response message may be an acknowledge message for the test mode initiation command, where the acknowledge message is only sent if no foreign object is detected. A non-acknowledge may be transmitted by dedicated non-acknowledge data or by the absence of an acknowledge message.

The described approach may provide a particularly advantageous approach for many systems. For example, it may allow the approach to be introduced to systems, such as Qi, while requiring relatively few modifications.

Specifically, the approach allows for the power receiver to be the main controlling entity, which is in line with the Qi design philosophy. Alternatively or additionally, the approach may be particularly suitable for scenarios and systems wherein the communication is asymmetric, and specifically for systems that use asymmetric communication links. Indeed, the approach may be highly advantageous for systems wherein the communication bandwidth from the power transmitter to the power receiver is substantially lower than the communication bandwidth from the power receiver to the power transmitter. The approach may even allow implementations wherein relatively infrequently communicated single bit messages (such as acknowledge/non-acknowledge messages) may be used from the power transmitter to the power receiver.

The previous description has focused on scenarios wherein the test mode comprises a single test. However, in some embodiments, the test mode may comprise different possible tests, and specifically the foreign object detection may be based on different tests or test parameters in different scenarios. Specifically, the foreign object detector 209 may be arranged to perform the foreign object detection based on different load conditions.

As a specific example, the foreign object detector 209 may be capable of performing a foreign object detection assuming that the power receiver 105 is switched off and does not consume any power. It may also be capable of performing a foreign object detection assuming that the power receiver 105 consumes a certain amount of power, such as specifically an amount of power which allows the power receiver 105 to be in an on-state where e.g. it can operate a user interface etc., but with typically no or only reduced power being provided to the load of the power receiver 105.

The foreign object detector 209 may thus in some embodiments be capable of operating in different (sub) modes assuming different conditions, and specifically different power receiver load conditions.

In some embodiments or scenarios, such tests may be alternative tests. In other embodiments and scenarios, the tests may e.g. be sequential tests, and indeed the overall foreign object detection may comprise a plurality of tests. The tests that are used may further be conditional on each other.

For example, during a power on operation, the foreign object detector 209 may first perform a test with the power receiver 105 powered off and with only a very low level test signal being generated by the transmitter coil 103. It may estimate/calculate/measure the transmit power for this signal and compare it to a threshold. If the determined transmit power is below the threshold, it is considered that this test indicates that there are no foreign objects present. Otherwise, it is considered that a foreign object may be present and this may result in the power transmitter 101 terminating the power transfer initialization approach. Thus, ideally when the power receiver 105 is powered off, the power extracted from the power transfer signal should be very low, and indeed correspond to only a few eddy currents induced in conductive parts of the power receiver 105. Therefore, any higher than expected power provision may be indicative of a foreign object being present. In other embodiments, the foreign object detector 209 may instead be arranged to detect e.g. an impedance measure and determine whether this is in an expected range. If not, the foreign object detector 209 may consider that a foreign object has been detected.

If the first test is successful, i.e. no foreign object is detected, the controller 211 may in some embodiments be informed and in response proceed with the power transfer initialization without any further foreign object tests being performed. However, in other embodiments, the foreign object detector 209 may proceed to perform a second test in which the power receiver 105 loads the power transfer signal more substantially (it should be noted that the term power transfer signal relates to the signal of the transmitter coil 103 even when the system is not in the power transfer phase). Specifically, for this second test, the power receiver 205 may power its internal circuitry and possibly a reduced load 205. For example, the requested power may be kept sufficiently low to not risk unacceptable power dissipation in any potential foreign objects that might be present.

Accordingly, the power receiver 205 may be able to operate e.g. a user interface etc. The foreign object detector 209 may perform the second test and specifically compare a transmit power of the power transfer signal to a receive power estimate that has been transmitted to the power transmitter 101 from the power receiver 105. The difference may be compared to a threshold and if it exceeds the threshold, the second test may be considered to have resulted in a potential detection of a foreign object, and otherwise it may be considered that no foreign object has been detected. In the latter case, the system may proceed with the power transfer initialization. In the former case, the system may e.g. terminate the power transfer initialization or may e.g. initiate a user interaction in order for the user to confirm or deny the presence of a foreign object.

Thus, in this example, the different tests or test conditions may both be part of the foreign object detection, and may specifically be sequential tests. In other examples, only one test may be performed, and the two tests may be alternative foreign object detection tests. In this case, the test that is applied may depend on the operating condition, and specifically may be dependent on the operational phase in which the power transfer system is operating, or from which phase the test mode has been entered.

For example, when the system is initializing a new power transfer, the system may enter the power transfer phase via a power transfer initialization phase, e.g. as part of the ping, identification & configuration phase, or a negotiation phase. In this case, only the first test may e.g. be applied as part of this initialization, and the system may proceed with or terminate the power transfer initialization based only on the first test. In another scenario, a parasitic power loss may have been detected during the power transfer phase, and as a consequence the system may have switched to the test mode. In this case, it may be highly advantageous to maintain the power receiver 105 in an on state in order to provide e.g. an active user interface etc. Thus, in this case, the foreign object detector 209 cannot assume that the power receiver 105 does not consume any power. Also, it is required to provide a sufficiently strong power transfer signal for the relevant circuitry of the power receiver 105 to be powered. Accordingly, the foreign object detector 209 may proceed to perform the second test instead of the first test to determine whether any foreign object is present.

It will be appreciated that in systems with multiple (possible) foreign object tests, the power receiver 105 may also adapt its operation dependent on the test being performed. It will also be appreciated that further communication between the power transmitter 101 and power receiver 105 may be implemented to support the different tests.

Specifically, the power receiver 105 may communicate messages in response to which the foreign object detector 209 adapts its operation, and specifically adapts the foreign object tests being performed. In other scenarios, the use of a specific test may partly or fully be predetermined, and the applied test may depend on the specific operating scenarios in a predetermined and known way.

In some embodiments, the foreign object detector 209 may accordingly be arranged to operate in different test submodes depending on an operating parameter for the power transfer system. Specifically, it may be arranged to switch between different submodes depending on a current or previous operating phase and/or depending on a message received from the power receiver 105. The different subtest modes may use different power receiver operating parameter estimates. Specifically, the foreign object detection may be based on comparing a transmitted power from the power transmitter 101 with a received power received by the power receiver 105, and the estimated receiver power parameter for the power receiver 105 may be different in different sub test modes.

In some embodiments, the foreign object detector 209 may be arranged to adapt the foreign object detection in response to a parameter received from the power receiver.

As an example, during the power initialization, the power receiver 105 may initially be switched off, and the power transmitter 101 may generate a very low level power transfer signal which is not sufficient to wake up the power receiver 105. The power transmitter 101 may measure the transmitted power in this situation. It may then proceed to generate a ping signal which will power the power receiver 105.

The foreign object detector 209 may be arranged to autonomously perform the first test. If this indicates that no foreign object is present, the power transmitter 101 may proceed to the ping phase wherein a ping signal is generated.

In response to the ping signal, the power receiver 105 may transmit a message to the power transmitter 101, typically by load modulation. This message may e.g. include a receive power estimate from the power receiver 105 or may e.g. comprise a power threshold against which to compare the transmitted power. The ping signal may also power the internal circuitry of the power receiver 105.

In some embodiments, the power receiver 105 may transmit a power transfer signal loading indication to the power transmitter 101 wherein the power transfer signal loading indication is indicative of a loading of the power transfer signal by the power receiver 105. The power transfer signal load parameter may be indicative of a loading of the power transfer signal by the power receiver 105 when in an off state, i.e. when the power receiver 105 is switched-off. Alternatively or additionally, the power transfer signal load parameter may be indicative of a loading of the power transfer signal by the power receiver 105 when in an on state and with an external load being disconnected from the power receiver 105, the external load being a load powered by the power receiver 105 in the power transfer phase. E.g. in this scenario, only the load of a controller in the power receiver 105 is connected or e.g. an external high impedance load is connected, such as for example a 1 KOhm resistor. The foreign object detector 209 may be arranged to adapt the foreign object detection in response to the power transfer signal loading indication.

The power transfer signal load parameter indication may for example be an indication of the loading of the power transfer signal when the power receiver 105 is completely switched off, yet the power receiver 105 is positioned on the power transmitter 101 in readiness for being powered. The indication may accordingly reflect the amount and distribution of conductive material of the device of the power receiver 105, the amount of power being extracted due to eddy currents etc. As another example, the power transfer signal loading indication may specifically be an indication of the loading of the power transfer signal when the power receiver 105 is positioned on the power transmitter 101 and is powered by power transmitter 101 but with the external load being disconnected. Thus, in this example, the power transfer signal loading indication indicates the amount of loading of the power transmitter resulting from the device of the power receiver 105 being positioned on the power transmitter 101 as well as the loading of any operational internal circuitry (such as e.g. control or user interface circuitry) but with no external power provision. As yet another example, the power transfer signal loading indication may be an indication of the loading of the power transfer signal when the power receiver 105 is positioned on the power transmitter 101, is powered by power transmitter 101, and is connected to a reduced external load, or e.g. a reduced internal load, such as e.g. a resistor with a high resistance (e.g. more than 1 kOhm).

The power transfer signal loading indication may e.g. be provided directly as an estimate of the extracted power. However, in other embodiments, the power transfer signal loading indication may directly provide the detection threshold to be used by the foreign object detector 209 to evaluate whether a foreign object is present or not.

For example, the power receiver 105 may transmit a message to the power transmitter 101 which includes a threshold for the foreign object detector 209 to apply when performing a foreign object detection for a situation where the power receiver 105 is switched off completely. The foreign object detector 209 may then proceed to use this for the first test, i.e. in the first test mode. Similarly, the power receiver 105 may transmit a message to the power transmitter 101 which includes a threshold for the foreign object detector 209 to apply when performing a foreign object detection for a situation where the power receiver 105 is switched on but the external load 205 is disconnected. The foreign object detector 209 may then proceed to use this for the second test, i.e. in the second test mode. The power transmitter 101 may automatically switch between using the first and second thresholds (i.e. between the first and second test) based on the received messages, or e.g. based on the phase which the power transmitter 101 is currently in.

As a specific example, when initializing a power transfer operation, the power transmitter 101 may first generate a very low level power transfer signal which is not sufficient to power even the internal circuitry of the power receiver 105. Accordingly, the power receiver 105 will be switched off. However, the foreign object detector 209 may measure and store the power extracted from the power transfer signal, i.e. it may determine the transmit power in this scenario. Rather than directly use the determined transmit power, the foreign object detector 209 may store the value. The power transmitter 101 may for example generate this low level signal in the selection phase while seeking to detect if a power receiver has been positioned on the power transmitter 101.

The power transmitter 101 may then proceed to the ping phase and generate a ping signal which is sufficient to power the power receiver 105. The power receiver 105 may then support communication with the power transmitter 101, and may specifically transmit a message to the power transmitter 101 that includes a power transfer signal loading indication. Specifically, it may transmit a detection threshold for the transmitted power which can be compared to an estimated transmitted power of low level power transfer signal in order to detect if any foreign objects are present.

The power transmitter 101 may then proceed to perform a first test by comparing the stored estimated transmitted power to the received detection threshold. If the estimated transmitted power exceeds the received threshold, the foreign object detector 209 considers a foreign object to be detected.

In that case, the power transmitter 101 may terminate the power transfer initialization, and may specifically power-off. It may then possibly repeat the process after a typically relatively short delay (e.g. after some seconds).

If the stored estimated transmitted power does not exceed the threshold, the foreign object detector 209 considers that no foreign object is present, and it may accordingly proceed with the power transfer setup.

The power transmitter 101 may in this way perform a first foreign object detection test for a situation where the power receiver 105 extracts no or very little power.

The power transmitter 101 may furthermore communicate the results of this first foreign object detection test to the power receiver 105. Specifically, it may communicate the result by transmitting an ACK (ACKnowledge) or NACK (Non-ACKnowledge) message to the power receiver 105. The NACK message may include a flag which can indicate that the reason for the NACK is that a foreign object was detected.

In response, the power receiver 105 may e.g. provide user feedback via a user interface of the power transmitter 101, where the user feedback indicates that a foreign object was detected by the power transmitter 101.

If no foreign object is detected, the power transmitter 101 may e.g. proceed to the power transfer phase, possibly via intervening phases.

As part of the initialization process, the power receiver 105 may also transmit a second power transfer signal loading indication to the power transmitter 101, and specifically a power transfer signal loading indication reflecting a loading of the power transfer signal from a power receiver 105 that is switched-on but has a reduced external load (and specifically a power receiver 105 that is switched-on but with the external load being switched off).

The foreign object detector 209 may accordingly operate in a test mode wherein the load of the power transfer signal is (assumed to be) reduced. This may for example happen in response to a detection of a high parasitic power loss during the power transfer phase. For example, as previously described, the power transmitter 101 may switch to the test mode if the parasitic power loss during the power transfer phase exceeds a given threshold indicative of the potential presence of foreign object.

In this case, the foreign object detector 209 may perform the second test, i.e. it may determine a power difference between the transmitted power and the received power, and compare this to the second threshold. If the threshold is exceed, the power transmitter 101 may transmit a message to the power receiver 105 indicating that a foreign object has been detected. For example, a NACK message indicating a foreign object detection may be transmitted.

When receiving such a message, the power receiver 105 may proceed to generate a user output using a user interface of the power transmitter 101.

The power receiver 105 may decide to recover from a foreign object trigger in power transfer phase with the purpose to check more accurately for a foreign object and then return to the power transfer phase, and may accordingly transmit a request to the power transmitter 101 to retry the second test. For example, the user may be requested to remove any foreign objects present and press a button to confirm. In response, the power receiver 105 may generate a request for the power transmitter 101 to restart the power transfer.

If the power transmitter 101 is successful when performing the foreign object detection, i.e. when no foreign object is detected by the foreign object detection operation, the power transmitter 101 returns to the power transfer phase and starts providing power to the power receiver 105. It may further communicate this to the power receiver 105, e.g. by transmitting an ACK message, e.g. with a flag to indicate a successful foreign object detection. If it is not successful, or if no request for returning to the power transfer phase is received, the power transmitter 101 may terminate the power transfer operation and return to the selection phase.

Thus, as previously described a highly advantageous foreign object detection operation may be achieved by the power transmitter 101 and the power receiver 105 cooperating effectively. The communication of the foreign object detection result not only allows the functionality to be split across the power transmitter 101 and the power receiver 105 but also allows an improved operation. For example, it allows the power receiver 105 to provide user feedback which may not only allow the user to be informed of the potential foreign object, but also allows the user to rectify the situation and restart the power transfer. In addition, it allows the power receiver 105 to remain in control of the operation of the system, and thus allows the overall system to e.g. follow the design principles of the Qi power transfer system.

The system may be arranged to dynamically adapt at least one of the foreign object detection and the parasitic power loss detection algorithms. The system may include functionality for adapting e.g. the decision criterion for the foreign object detection or the parasitic power loss detection in response to the operation of the system.

Specifically, when the system enters the power transfer mode, it does so following a test mode. During the test mode, a highly accurate foreign object detection has been performed. Accordingly, there is a high probability that when the system enters the power transfer mode, it does so with no foreign object present, and accordingly it is expected that the parasitic power loss detection should reflect this, i.e. that a parasitic power loss estimate which is not close to be considered to reflect a parasitic power loss scenario should be generated. Accordingly, the parasitic power loss detection may be calibrated based on the conditions and characteristics when the power transfer mode is initialized. Accordingly, the system includes the calibration unit 213 being arranged to initialize an adaptation of a first parameter of the parasitic power loss detection in response to operating parameter values for the power transfer phase. The calibration unit 213 is arranged to exclude power transfer parameters (of the power transfer phase) from the adaptation if the operating parameter values are for times outside of an initial time interval of entering the power transfer phase (following the foreign object detection estimate being indicative of no detection of a foreign object).

Figure 7:
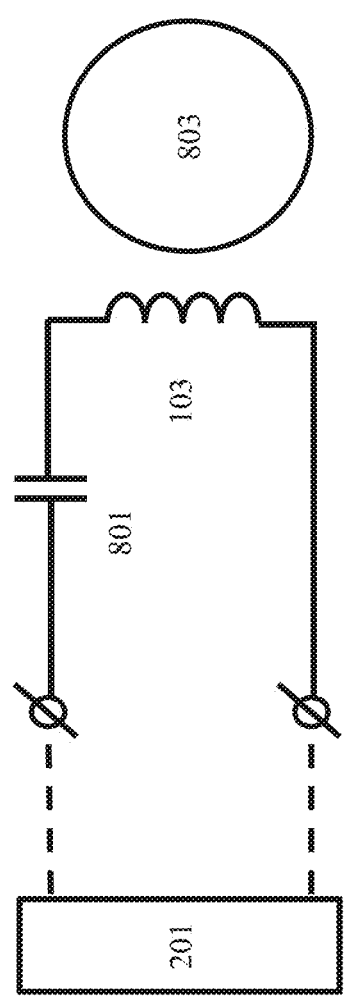
FIG. 7 illustrates an example of elements of a power transmitter in accordance with some embodiments of the invention.

Accordingly, the calibration unit 213 may be arranged to initialize an adaptation/calibration of a parameter of the parasitic power loss detection upon entering the power transfer phase. In the example of FIG. 7, the power transmitter 101 comprises the calibration unit 213 213 but it will be appreciated that in other embodiments, the calibration unit 213 may fully or partially be positioned elsewhere, such as e.g. fully or partially in the power receiver 105.

The adaptation of the parasitic power loss detection may specifically be such that the algorithm is adapted towards the decision being closer to an expected performance when no foreign object is present. For example, if the parasitic power loss detection is based on comparing a difference between a transmit power and a receive power to given decision thresholds, the adaptation may comprise adapting the determination of the transmit power, the determination of the receiving power and/or the thresholds such that the calculated power difference relative to the thresholds is biased towards an expected relationship corresponding to there being no foreign object present. For example, if the calculated difference is close to a detection threshold indicative of a parasitic power loss being detected, the determination of the transmit power, the receiving power and/or the thresholds may be adapted such that the calculated difference is not as close to the threshold.

The adaptation may thus accordingly adapt the detection performance based on the assumption that the power transfer mode is initialized with no foreign object being present.

However, the longer the system remains in the power transfer mode, the higher the probability that a foreign object has been brought into proximity of the power transmitter 101. For example, a foreign object may be positioned in relative proximity to the power transmitter 101 but at a distance at which the foreign object is not detected by the coarser parasitic power loss detection of the parasitic power loss detector 207.

Accordingly, the calibration unit 213 may be arranged to consider only operating parameter values of the power transfer phase which represent operating conditions within an initial time interval of entering the power transfer phase, and specifically only operating parameter values of the power transfer which are based on measurements within the initial time interval.

The adaptation/calibration of the parasitic power loss detection is accordingly only based on operating parameter values that are determined for the initial time interval of the power transfer phase and is not based on power transfer phase operating parameter values that are determined outside the initial time interval. In many embodiments, the adaption is a real time adaptation wherein operating parameter values may be determined immediately based on measurements and used immediately to perform the adaptation. Thus, in such embodiments, there is a direct temporal correspondence between when the operating parameter values are determined (the underlying measurements are made) and when the adaptation is performed. Accordingly, in such embodiments, there is a direct correspondence between which operating parameters values are considered for the adaptation and the performance of the adaptation. Thus, in such embodiments, the restriction of using power transfer phase operating parameter values only within the initial time interval can be achieved by controlling the adaptation to be performed in the initial time interval. Accordingly, for such embodiments, terminating the adaptation and terminating/ending the initial time interval are equivalent.

The following description will focus on embodiments wherein such real time adaptation is performed. Accordingly, references to terminating the adaptation may be considered as equivalent to, and a specific example of, terminating/ending the initial time interval in which the operating parameter values are valid to be used for adaptation. However, it will be appreciated that the approach is not restricted to such real time adaptation or to the adaptation interval to be the same as the initial time interval for which operating parameter values are considered to be valid. Rather, in other embodiments, these time intervals may be different, and e.g. the calibration unit 213 may determine and store operating parameter values for the initial time interval which are then used for adaptation at a later time. Indeed, in some embodiments, the measurements from which the operating parameter values are generated may be determined (only) in the initial time interval, while the determination of the operating parameter values from these measurement values, as well as the adaptation, is being performed at subsequent times. For such non-real time adaptation approaches, the following comments and references to terminating the adaptation may be considered to refer to terminating the initial time interval.

Thus, in the specific example, the calibration unit 213 is arranged to perform an adaptation during an initial time interval following the entering of the power transfer mode/phase. For example, if the calibration unit 213 is part of the power transmitter 101, the adaptation and the initial time interval may be initialized when the power transmitter 101 is entered into the power transfer mode corresponding to the start of the power transfer phase. At the end of the initial time interval, the calibration unit 213 may terminate the adaptation while remaining in the power transfer phase. Thus, although no foreign object has been detected, and accordingly it is considered that it is acceptable to continue the power transfer, it may be considered that the risk of the operating scenario not being ideal increases, and that the adaptation may accordingly advantageously be terminated.

The termination of the adaptation (or more generally the termination of the initial time interval) may be in response to the detection of an event occurring. In some embodiments, the adaptation may be terminated in response to a duration of the power transfer mode exceeding a threshold. Thus, the system may proceed to adapt the parasitic power loss detection during an initial time interval of the power transfer mode starting. However, in order to ensure that the adaptation/calibration is not based on a scenario wherein an (undetected) foreign object might be present, the adaptation/calibration is automatically terminated after a potentially predetermined duration.

Alternatively or additionally, the termination of the adaptation/calibration may be in response to the detection of a specific event, and specifically in response to a detection that a power transfer parameter exceeds a reference operating range. The power transfer parameter may be a parameter which is indicative of a power transfer characteristic, such as specifically a loading of the wireless inductive power signal. The detection of the loading of the wireless inductive power signal may be direct or indirect. E.g., the calibration unit 213 may detect that the value of the load 205 has changed, and accordingly it may proceed to terminate the initial time interval.

As an example, during the power transfer, the power receiver 105 may detect that the available power suddenly decreases and that it is necessary to transmit a series of power up requests to the power transmitter 101. Such a scenario may possibly occur due to a foreign object being positioned within the electromagnetic field of the power transmitter 101, i.e. it may be due to a foreign object draining power from the wireless inductive power signal. In response to such a detection, the system may terminate the adaptation and calibration even if no parasitic power loss is detected by the system. Thus, the impact of the foreign object may be too low to cause concern and require the power transfer to be terminated but may be sufficiently high to bias the adaptation resulting in potentially degraded parasitic power loss detection e.g. for future power transfers.

As another example, the calibration unit may be arranged to terminate the adaptation of the parameter in response to a detection of a change in a loading of the wireless power transfer signal by the power transmitter 101. For example, the power transmitter 101 may detect that the loading of the power transmitter 101 suddenly increases. This may be due to a load step at the power receiver 105 but could potentially also be due to a foreign object loading the wireless inductive power signal being introduced. Accordingly, the calibration unit may terminate the adaptation.

The approach may thus allow a power transfer system wherein reliable parasitic power loss detection is possible during the power transfer phase. Furthermore, the system may adapt the parasitic power loss detection automatically and without requiring any user input. Such an adaptation is based on the existence of a test mode, and may specifically be based on the test mode constraining operating parameters of the power receiver 105 such that a more reliable/accurate foreign object detection can be performed prior to the system entering the power transfer mode.

In the following, a specific example of an operation of the system of FIG. 2 will be described.

In the described approach, user involvement in order to check whether a foreign object is located near the magnetic field of the power transmitter is not necessary before calibrating the power transmitter 101 and power receiver 105 to each other in order to improve on the accuracy.

In the example, the power transmitter 101 can adapt its power loss calculation for the reported received power and can accordingly improve on its capability to detect the appearance of a foreign object by the parasitic power loss of the power transfer mode while reducing the probability of false positives. In particular, the power transmitter 101 can achieve this without the need to involve the user due to the power receiver 105 being able to operate in two modes, namely a test mode in which the power receiver 105 is in a condition such that it enables the power transmitter 101 to accurately determine whether a foreign object is present or not, e.g. by disconnecting its target load; and a power transfer mode in which the power receiver 105 reports its received power to the power transmitter 101 to enable the power transmitter 101 to apply the parasitic power loss detection.

The power receiver 105 may start in the test mode and indicate this to the power transmitter 101 in order to enable the power transmitter 101 to accurately detect whether a foreign object is present or not. Subsequently, the power receiver 105 may proceed to the power control mode, and may indicate this to the power transmitter 101. It then communicates a received power message to the power transmitter 101 to enable the power transmitter 101 to calculate a receive power estimate, and thus to perform the parasitic power loss detection.

If the power receiver 105 is in the test mode, the power transmitter 101 can detect the presence/absence of a foreign object with high accuracy.

If the power receiver 105 is in the power transfer mode and no foreign objects are detected in the preceding test mode, the power transmitter 101 proceeds to detect the presence/absence of a foreign object by applying an adaptive parasitic power loss detection algorithm. As long as no foreign object is detected in this mode, the power transmitter 101 may in this example adapt its power loss calculation, e.g. towards the middle of an upper and a lower boundary (i.e. midway between decision thresholds) in order to improve its sensitivity to foreign objects while maintaining sufficient threshold to avoid false triggers.

If the calculated power loss exceeds a threshold, and this is not caused by a load-change of the receiver, then the system may return to the test mode and disconnect its load (and transmit a test mode initiation command to the power transmitter 101.

The advantage of the adaptation is that the power loss detection is modified towards being more of a relative measurement rather than an absolute measurement. An advantage of the different modes is the increased capability of the system to resolve situations in which the parasitic power loss detection indicates that a foreign object may be present.

More specifically, the power receiver 105 may start in the test mode and communicate a test mode initiation command to the power transmitter 101 to indicate that it is in the test mode. The power receiver 105 withholds load-modulation when in the test mode. The test mode then starts with the end of the message indicating the test mode (the test mode initiation command) and may e.g. end at the start of a new message, such as specifically the test mode termination command. Optionally the test mode initiation command may indicate the minimum time that the power receiver 105 will be in test mode.

On reception of the test mode initiation command, the power transmitter 101 may proceed to apply a dedicated foreign object detection algorithm which is based on an assumption of the power receiver 105 operating in a constrained mode.

If the power transmitter 101 detects a foreign object in the test mode, it may respond with an indication of a foreign object detection to the power receiver 105. On the reception of such an indication, the power receiver 105 can remain in the test mode and will not proceed to transmit a test mode termination command or to enter the power transfer mode. If the power transmitter 101 detects no foreign object in the test mode, it can respond with an indication of there being no foreign objects detected. On the reception of such an indication, the power receiver 105 can proceed to the power transfer mode, and can specifically implement a power transfer phase.

As soon as the power receiver 105 proceeds to the power transfer mode, it communicates a test mode termination command to indicate that it is in power transfer mode. On reception of the test mode termination command, the power transmitter 101 switches to the power transfer mode to support the power transfer phase, and it begins to apply the parasitic power loss method.

In the power transfer mode, the power receiver 105 sends received power messages (power control error messages), and the power transmitter 101 applies an adaptive parasitic power loss detection method. It specifically applies a power loss method corresponding to the Qi approach by calculating the power loss as difference between reported received power and the measured transmitted power. Specifically, a parasitic power loss estimate is generated by subtracting a receive power estimate from a transmit power estimate. The parasitic power loss estimate can then be compared to a decision threshold and if this threshold is exceeded, a parasitic power loss detection is generated to indicate that the parasitic power loss is above a given level (and thus e.g. indicating the possibility of a foreign object being present).

In addition, the power transmitter 101 proceeds to adapt the power-loss calculation and/or decision thresholds depending on operating parameter values for an initial time interval of the power transfer phase. The initial time interval may e.g. start at the beginning of the power transfer phase (e.g. specifically when the power transmitter 101 and/or the power receiver 105 switches to the power transfer mode), and may end after a duration which e.g. may be predetermined, determined dynamically, or which may e.g. be determined by the occurrence/detection of an event. The operating parameter values may specifically include receive power estimates determined from the received power messages from the power receiver 105.

However, when the initial time interval ends, the operating parameter values (specifically the receive power estimates and/or the transmit power estimates) are no longer considered for the adaptation, i.e. the operating parameter values for times within the power transfer phase but outside the initial time interval are excluded from affecting/influencing the adaptation. The operating parameter values may be excluded e.g. by the system no longer calculating them and/or e.g. by values still being calculated (and e.g. used to control the power transfer operation) but no adaptation being performed on the basis of them. For real-time adaption, the exclusion may e.g. be achieved simply by terminating the adaptation.

As an example, as long as the power loss is within an acceptable range and the initial time interval has not ended, the power transmitter 101 may adapt the power loss calculation such that the power loss shifts towards the middle of an upper and a lower decision threshold. The power transmitter 101 may further indicate to the power receiver 105 that the power loss is below the threshold corresponding to a detection of a foreign object.

If the power loss exceeds the upper threshold, the power transmitter 101 may assume that this is caused by a load-change, a worsened alignment of the power receiver 105, or the appearance of a foreign object near the magnetic field. The power transmitter 101 can then inhibit the adaptation of the power loss calculation and indicate to the power receiver 105 that the power loss has exceeded a threshold. Thus, in some embodiments, the initial time interval may be determined by a detection that the power loss exceeds the upper threshold.

The power transmitter 101 can check whether the power receiver 105 has made a load step or load-dump by comparing the latest reported received power with the previously reported received power. In case the reported received power was increased, the power receiver 105 has made a load-step. In case the reported received power was decreased, the power receiver 105 has made a load dump. In case the load-step/dump has taken place, the power transmitter 101 may ignore that the power loss has exceeded the upper threshold until the next reported received power message. Thus, in such a case, the upper threshold being exceeded may not directly result in the initial time interval being terminated.

If the power loss drops below the lower threshold, the power transmitter 101 may assume that this is caused by a load-change, an improved alignment of the power receiver 105, or the dis-appearance of a foreign object near the magnetic field. In response, the power transmitter 101 may inhibit the adaptation of the power loss calculation but may still indicate to the power receiver 105 that the power loss has not exceeded the threshold corresponding to a foreign object being present. The power transfer may accordingly continue. Thus, in some embodiments, the initial time interval may be determined by a detection that the power loss exceeds the lower threshold.

If the parasitic power loss detector 207 continues to detect consecutive power losses exceeding the upper threshold (and these are not caused by load changes), and if it does not receive a message from the power receiver 105 that it has changed to test mode, the power transmitter 101 may reduce the power level to a safe limit and stop the adaptation of the power loss calculation completely.

If the power loss returns to within the thresholds after a short time (e.g. at the next received power message), the power transmitter 101 may in some embodiments resume the adaptation of the power loss calculation.

On reception of one or more parasitic power loss detection indications from the power transmitter 101, the power receiver 105 may proceed to reduce the power demand (e.g. transmit power down requests), proceed to the test mode, and communicate the test mode initiation command to the power transmitter 101.

On reception of a test mode initiation command from the power receiver 105, the power transmitter 101 proceeds to the test mode and resumes the application of the more accurate foreign object detection method.

The communication of the detection outcomes from the power receiver 105 to the power transmitter 101 may specifically be by using acknowledge/non-acknowledge messages.

At the reception of the test mode initiation command, the power transmitter 101 may proceed to detect whether a foreign object is present or not by applying an accurate foreign object detection method.

If no foreign object detected, the power transmitter 101 can respond with an ACK-message.

If a foreign object detected, the power transmitter 101 can respond with a NAK-message.

When in the power transfer mode, the power receiver 105 may transmit power control messages (received power messages) to the power transmitter 101. This may proceed to perform the parasitic power loss to detect whether a foreign object is present or not.

If no foreign object/high parasitic power loss is detected, the power transmitter 101 can respond with an ACK-message.

If a foreign object/high parasitic power loss is detected, the power transmitter 101 can respond with a NAK-message.

In many embodiments, the parasitic power loss detection is performed by determining a parasitic power loss estimate and comparing this to a detection threshold as previously described. The calibration unit 213 may e.g. perform the adaptation by adapting the generation of the parasitic power loss estimate, the detection threshold, or both.

The calibration unit 213 may be arranged to increase the detection threshold, when the foreign object detector 209 indicates that no foreign objects are present after the system enters the test mode from the power transfer mode due to the parasitic power loss detector 207 indicating that a power loss above the threshold has been detected. Thus, after a false detection has occurred, the calibration unit 213 may increase the detection threshold that the parasitic power loss estimate must exceed for there to be considered to be a parasitic power loss detection. In this way, the system will adapt the operation to reduce the likelihood of a false detection. Thus, the system will introduce a(n) additional bias away from detecting a parasitic power loss.

In some embodiments, the threshold may e.g. be changed by a fixed predetermined amount. In other embodiments, the amount of adaptation may be dependent on the specific operating characteristics, such as e.g. dependent on the degree to which the parasitic power loss estimate exceeds the previous threshold.

Thus, if the parasitic power loss detector 207 generates a number of false detections (as determined by comparison to the foreign object detector 209), the system will adapt its operation by increasing the requirement for false detections and thereby reduce the number of false detections. The process may e.g. be repeated until an acceptable frequency of false detections occurs.

In some embodiments, the system may e.g. be initiated with the detection threshold set at a relatively low level, and indeed to a level, which is expected to be too low. In such embodiments, the system will adapt to the appropriate detection threshold by this gradually being increased for each false detection until a reasonable frequency of the false detections is achieved.

In some embodiments, an adaptation may also be performed if the foreign object detection indicates that there is indeed a foreign object present. For example, when a foreign object is detected by the foreign object detector 209 after the test mode has been entered due to a detection of the parasitic power loss exceeding a threshold, the calibration unit 213 may reduce the detection threshold to reflect the successful detection. In such embodiments, the adaptation will be dependent on foreign object detection and will specifically be in different directions (i.e. with respect to the increase or decrease in probability of a parasitic power loss detection) for a foreign object detection indicating false detection and for one that does not.

However, although such an approach may be suitable in some scenarios, in many embodiments, the presence of foreign objects will be relatively rare and will not be relied upon to provide the desired adaptation. In some embodiments, adaptation is accordingly only performed in response to a foreign object detection, which is indicative of a false detection.

The calibration unit 213 is arranged to initialize the adaptation of a parameter of the parasitic power loss detection based on operating parameter values for the initial time interval. The adaption may e.g. be by adapting an end point of the acceptable range for the parasitic power loss estimate. For example, the range may be adapted to be symmetric around the average parasitic power loss estimate determined within the initial time interval.

In some embodiments, the adaptation may alternatively or additionally be by an adaptation of the model (e.g. functions/equations) used to determine the parasitic power loss estimate.

For example, in some embodiments, the calibration unit 213 may be arranged to amend the approach for determining the transmit power estimate. E.g. when a high parasitic power loss estimate is generated for the initial time interval, an offset to the transmit power estimate may be introduced (or increased) that reduces the transmit power estimate. For example, a compensation factor or offset to the calculation of the transmit power estimate may be added or modified. Such a compensation may thus adapt the calculated transmit power estimate for future compensations such that the estimated transmit power will be reduced. This reduction may for example reflect measurement bias in determining the voltage or current provided to the transmit coil 103, bias errors in the original model for determining the transmit power estimate, or impact of unaccounted for power dissipation in the power transmitter 101 itself, whether as part of the generation of the power signal (e.g. resistive losses in the transmit coil 103) or as losses incurred by induction in elements of the power transmitter 101 itself (e.g. in metal parts of the device containing the power transmitter 101).

In some embodiments, the calibration unit 213 may thus bias the transmit power estimate towards lower values.

In other embodiments, the calibration unit 213 may be arranged to amend the approach for determining the receive power estimate. E.g. when a negative parasitic power loss estimate is generated for the initial time interval, an offset to the receive power estimate may be introduced (or increased) that reduces the receive power estimate. For example, a compensation factor or offset to the calculation of the receive power estimate may be added or modified. Such a compensation may thus adapt the calculated receive power estimate for future compensations such that the estimated receive power will be decreased. This decrease may for example reflect measurement bias in calculating the received voltage or current of the receive coil 107, bias errors in the original model for determining the receive power estimate, or reduced impact of unaccounted for power dissipation in the power receiver 105 itself, whether as part of the extraction of power from the power signal (e.g. resistive losses in the receive coil 107) or losses incurred by induction in elements of the power receiver 105 itself (e.g. in metal parts of the device containing the power transmitter 101).

In some embodiments, the calibration unit 213 may thus bias the receive power estimate towards lower values.

In some embodiments, the calibration unit 213 may bias the parasitic power loss estimate towards lower values.

In some embodiments, the calibration unit 213 may bias the detection threshold towards higher values.

In some embodiments, only one of the transmit power estimate and the receive power estimate may be adapted whereas in other embodiments both the transmit power estimate and the receive power estimate may be adapted. Similarly, in some embodiments only one of the parasitic power loss estimate and the detection threshold may be adapted whereas in other embodiments, both may be adapted.

In some embodiments, the detection threshold (i.e. the upper value of the range) may be set to zero, and the adaptation may bias the parasitic power loss estimate (e.g. by biasing the transmit power estimate or the receive power estimate).

For example, there may be a requirement that a power receiver may not underestimate the received power level. Therefore, to introduce a margin for uncertainty, the power receiver will typically overestimate the received power. In combination with a power transmitter that does not underestimate its transmitted power, the resulting parasitic power loss estimate is normally negative. A positive parasitic power loss estimate may therefore be considered an indication of the presence of a foreign object.

The approach addresses the issue that if a power receiver would be allowed to underestimate its received power, the power transmitter has to include this potential underestimation in its threshold. The threshold would in this case depend on the uncertainty of the power receiver. The possible uncertainty may be different for different versions of the standard, and therefore could require the power transmitter to use different thresholds for different versions.

In many embodiments, the calibration unit 701 may perform adaptation upon entering the power transfer mode. The adaptation may be restricted to only consider operating parameter values of the power transfer phase which are for the initial time interval, i.e. which represents the conditions during the initial time interval. However, operating parameter values that are determined for times which are outside the initial time interval are not included in the adaptation. Specifically, operating parameter values that are based on measurements performed in the power transfer phase but outside of the initial time interval are excluded from being considered by the adaptation.

As the foreign object detector 209 has indicated that no other objects are present, the calibration may be performed under the assumption that only the power receiver 105 and the power transmitter 101 are present as the operating parameter values reflect the conditions shortly after the foreign object detector 209 has indicated that no foreign object is present. As a specific example, the assumption may lead to a consideration that the parasitic power loss estimate should be zero in this case, and thus the parasitic power loss detector 207 may determine a parasitic power loss estimate for a given power level. If the parasitic power loss estimate is different from zero, a compensation offset corresponding to the calculated parasitic power loss estimate may be stored for the power level. This may be repeated for a range of power levels resulting in a set of compensation factors being stored for the pairing of this power transmitter 101 and power receiver 105.

The detection algorithm applied by the parasitic power loss detector 207 during normal power transfer may subsequently apply this compensation factor. Specifically, for a given power signal value, the parasitic power loss detector 207 may retrieve the compensation factor stored for the nearest power level (or may interpolate between different values). It may then proceed to apply this offset when calculating the parasitic power loss estimate. In the ideal case, the parasitic power loss estimate will accordingly be zero unless a foreign object is present.

The adaptation introduced to the parasitic power loss detection may in many embodiments be specific to the power transmitter 101 and power receiver 105 combination, i.e. the adapted detection algorithm may be applied to power transfers between the specific power transmitter 101 and power receiver 105 but not to other pairings. In many embodiments, the calibration unit 213 may be arranged to initialize a calibration of the power transmitter 101 and the power receiver 105 pairing, and may store the resulting compensation or calibration data for the specific pairing. For example, a suitable offset for the parasitic power loss estimate (e.g. the receive power estimate or the transmit power estimate or the detection threshold) may be determined and stored for a range of different power levels for each new pairing of the power transmitter 101 with a power receiver. Thus, different data may be used and stored for different receivers and individual adaptations to the specific devices can be used. This may provide more reliable and accurate detection performance in many embodiments.

As the accurate foreign object detection has been performed immediately prior to the system entering the power transfer phase, a calibration or adaption can be performed upon entering the power transfer phase based on an assumption that only the power receiver 105 and the power transmitter 101 are present, i.e. that there are no foreign objects present. As a specific example, the assumption may lead to a consideration that the parasitic power loss estimate should be zero in this case, and thus the parasitic power loss detector 207 may determine a parasitic power loss estimate for a given power level. If the parasitic power loss estimate is different from zero, a compensation offset corresponding to the calculated parasitic power loss estimate may be stored by the calibration unit 213 for the power level. This may be repeated for a range of power levels resulting in a set of compensation factors being stored for the pairing of this power transmitter 101 and power receiver 105.

The detection algorithm applied by the parasitic power loss detector 207 during normal power transfer may subsequently apply this compensation factor. Specifically, for a given power signal value, the parasitic power loss detector 207 may retrieve the compensation value stored for the nearest power level (or may interpolate between different values). It may then proceed to apply this offset when calculating the parasitic power loss estimate. In the ideal case, the parasitic power loss estimate will accordingly be zero unless a foreign object is present. Alternatively, the offset may e.g. be applied to the detection threshold.

In the example, the transmit power estimate is generated by the parasitic power loss detector 207 based on the measurements of the coil current and voltage (such as e.g. by determining the power provided to the coil reduced by the estimated power dissipation in the coil). The transmit power estimate may specifically be generated based on locally available measurements and using a suitable model for the transmit power estimate, such as e.g. previously described.

Due to the immediately preceding foreign object detection being performed in a dedicated test mode, the probability of there being no foreign objects at the initialization of the power transfer phase is very high but inherently reduces as time passes. Accordingly, the calibration unit 213 is arranged to adapt the parasitic power loss detection based on the operating conditions within a time interval of the system entering the power transfer phase, i.e. within an initial time interval of the power transfer phase (and specifically within an initial time interval of the power transmitter 101 and/or the power receiver 105 entering a power transfer mode).

The calibration unit 213 is specifically arranged to adapt a parameter (such as an offset to the transmit power estimate, the receive power estimate or the detection threshold) based on receive power estimate indications received from the power receiver 105 within this initial time interval. Thus, the receive power estimates that are received (or generated) within the initial time interval are used to adapt the parasitic power loss detection whereas receive power estimates that are received outside of the initial time interval are not used to adapt the foreign object detection. Instead, these receive power estimates are used to perform the foreign object detection (and/or e.g. detecting a bad functioning power receiver, or detecting a bad positioned power receiver).

The initial time interval is typically kept to a relatively short time interval. In many embodiments, the initial time interval has a duration not exceeding 30 sec, and in many embodiments not exceeding 30, 15, 10, 5 or even 2 seconds. Such values may be particularly advantageous and may in many embodiments ensure that the risk of a foreign object being positioned proximal to the power transmitter 101 while calibration is being performed is sufficiently low. In many embodiments, the initial time interval has a duration not less than 0.5 sec, 1 sec, 2 sec, 5 sec, 10 sec or even 15 seconds. Such values may be particularly advantageous and may in many embodiments provide an appropriate number of receive power estimates from the power receiver. In many embodiments, the power receiver 105 may be required to provide a new receive power estimate every 2-4 seconds, and thus the mentioned durations may provide an advantageous trade-off between the number of receive power estimates received for the calibration, and the risk of a foreign object being positioned in the neighborhood during calibration/adaptation. In many embodiments, particularly advantageous performance is achieved for a duration of an initial time interval being in the range of 0.5 sec to 2 sec; of 1 sec-5 sec; of 2 sec-10 sec, or of 5 sec-30 sec.

In the example, the receive power estimate is not calculated by the power transmitter 101 but rather is generated as a receive power estimate transmitted to the power transmitter 101 from the power receiver 105. Accordingly, the power transmitter 101 may be arranged to receive data messages from the power receiver 105. The data messages may specifically be modulated onto the power signal by load modulation as known from e.g. the Qi Standard. Indeed, the received power values required to be generated by the power receiver 105 and transmitted to the power transmitter 101 may be used directly as the receive power estimates.

Specifically, in power transfer systems such as the Qi standard, the power receiver 105 is required to communicate receive power estimates to the power transmitter 101. The received power values are indicative of the power that is received by the power receiver 105.

In some embodiments, the power receiver 105 may report a receive power estimate, which corresponds directly to the power that is provided to the load of the power receiver 105. However, in many embodiments, the power receiver 105 will generate a receive power estimate that also includes power loss/dissipation in the power receiver 105 itself. Thus the reported receive power estimate may include both power provided to the load as well as power loss in the power receiver 105 itself. For example, it may include measured or estimated power loss in the rectification circuits and/or the receiver coil.

In many embodiments, the receive power estimate may be provided directly as a power value. However, it will be appreciated that in other embodiments other indications may be provided, such as a current and/or voltage. For example, in some embodiments, the receive power estimate may be provided as the current or voltage induced in the receive coil 107. In such scenarios, the parasitic power loss detector 207 and/or the calibration unit 213 may calculate the receive power estimate based on the received values.

The parasitic power loss detector 207 may accordingly generate the parasitic power loss estimate based on the received receive power estimate and a locally generated transmit power estimate. The resulting parasitic power loss estimate may then be compared to a detection threshold. If the parasitic power loss estimate exceeds the threshold, a parasitic power loss is considered to be detected.

However, during the initial time interval of the power transmitter 101 entering the power receiver 105, it may be assumed that no foreign object is present as this would have been detected by the immediately preceding foreign object detection. Therefore, the receive power estimate received from the power transmitter 101 can be used to calibrate and/or adapt the parasitic power loss detection (or indeed the foreign object detection). Thus, within the initial time interval, the calibration unit 213 may use the received receive power estimates and the locally generated transmit power estimates to calibrate the foreign object detection. Specifically, the calibration unit 213 may determine compensation parameters for generating the transmit power estimate, for the receive power estimate, and/or for the detection threshold used.

The initial time interval may in many embodiments have a starting time which coincides with the start of the power transfer phase. In many embodiments, the calibration unit 213 may be arranged to start the initial time interval when the power transmitter 101 or the power receiver 105 switches into the power transfer mode. In some embodiments, the initial time interval may e.g. have a start time prior to the power transfer phase, for example a time may be initialized during the test mode when it is determined that the foreign object detection estimate is indicative of no detection of a foreign object.

The end time of the initial time interval may be determined differently in different embodiments.

In some embodiments, the initial time interval may have a predetermined duration, or e.g. have a predetermined duration from the start of the power transfer phase. Thus, in many embodiments, the calibration unit 213 may be arranged to terminate the initial time interval in response to a detection that a duration of the initial time interval exceeds a threshold or that the duration of the time since the start of the power transfer phase exceeds a threshold. Typical times may in many embodiments be in the order of 10 sec-60 sec.

In some embodiments, the calibration unit 213 may be arranged to terminate the initial time interval in response to an event being detected. This may in many embodiments be combined with a predetermined maximum duration. For example, in many embodiments, the initial time interval may be determined after a fixed duration unless an event has been detected which results in an earlier termination of the initial time interval.

In some embodiments, the event may be that a power transfer parameter exceeds a reference operating range. The power transfer parameter may be any parameter reflecting the power transfer operation, and may specifically be a receive power and/or a transmit power. For example, if it is detected that the power receiver 105 keeps requesting additional power resulting in a transmit power above a given threshold, the calibration unit 213 may proceed to terminate the initial time interval.

In some embodiments, the calibration unit 213 may be arranged to terminate the initial time interval in response to a detection of a change in a loading of the wireless power transfer signal. For example, if the power transmitter 101 detects that the loading of the wireless inductive power signal suddenly changes, this could potentially be due to a foreign object entering the vicinity of the transmit power inductor 103. This may be the case even if the resulting parasitic power loss estimate does not exceed the threshold for a parasitic power loss detection. Thus, in some embodiments, such a change may not be sufficient to exit the power transfer phase but may result in the calibration unit 213 terminating the initial time interval such that the detection is not adapted to a scenario wherein a foreign object may potentially be present.

In some embodiments, no parasitic power loss detection is performed during the initial time interval, and the received receive power estimates may be used exclusively for the adaptation and calibration of the parasitic power loss detection. However, in some embodiments, some parasitic power loss detection may also be performed during the initial time interval. For example, a parasitic power loss estimate may be generated by subtracting the received receive power estimate from the transmit power estimate. If the resulting parasitic power loss estimate is in a given range, it is considered that it is probable that there is still no foreign object present and the calibration unit 213 may calibrate the foreign object detection.

However, if the parasitic power loss estimate exceeds the range, this is indicative of a higher than expected parasitic power loss and this could potentially be due to a foreign object having been positioned in the proximity, the power receiver being erroneous, or the power receiver being badly positioned on the power transmitter such that metal parts of the device containing the power receiver are exposed to the magnetic field and dissipate an unacceptable amount of power. In this case, the receive power estimate is ignored and not used for calibration. The range may be substantially larger than the range normally (e.g. during the power transfer phase after the initial time interval) used for parasitic power loss detection.

Thus, in some embodiments, the calibration unit (213) may compare a receive power estimate to a power estimate for the power transfer signal (i.e. to a transmit power estimate) and discard the receive power estimate if the comparison is indicative of the (absolute value of the) difference between these exceeding a threshold. In this way, an additional safety precaution may be built in to reduce the risk of adapting the parasitic power loss detection to a situation wherein a foreign object has been positioned in the vicinity of the power transmitter 101 after the preceding foreign object detection but before the end of the initial time interval. Thus, for relatively small values of the parasitic power loss estimate during the initial time interval, it is considered that the difference is due to inaccuracies or small loads caused by the power receiver itself. Accordingly, the system may adapt the parasitic power loss detection to compensate for these. However, if the parasitic power loss estimate is too extreme during the initial time interval, this could be caused by a foreign object extracting a large amount of power, the power receiver being erroneous, or the power receiver being badly positioned on the power transmitter such that metal parts of the device containing the power receiver are exposed to the magnetic field and dissipate an unacceptable amount of power. Accordingly, the calibration unit 213 avoids compensating for this scenario. In the latter case, the system may take further action, such as returning to the test mode, or e.g. iterating the test.

In some embodiments, the calibration unit 213 may arranged to discard at least a first operating parameter value for a first operating parameter in response to a comparison of the first operating parameter value to an expected value for the first operating parameter. The first operating parameter value may be one that represents the conditions within the initial time interval and which would normally be used for adapting the parasitic power loss detection. However, if the comparison indicates that the difference to the expected value exceeds a given threshold (or more generally, if a distance measure indicative of a difference between the first operating parameter value and the expected value exceeds a threshold), then the first operating parameter values is excluded from being used for adapting the parasitic power loss detection (even though it is within the initial time interval). It will be appreciated that in many embodiments, a direct comparison, e.g. by subtracting the expected value from the first operating parameter value, may be used, but that in other embodiments an indirect comparison may be made, for example by evaluating whether the first operating parameter value results in an outcome that differs too much from the expected outcome.

For example, as described, a receive power estimate may be discarded/excluded from the adaptation if it results in a parasitic power loss estimate which exceeds the detection threshold, i.e. if it results in a parasitic power loss being detected. Thus, for expected receive power estimates, no parasitic power loss is expected to be detected. If a receive power estimate results in a parasitic power loss detection, this indicates that the difference to the expected value exceeds an acceptable level and accordingly the receive power estimate is not used to adapt the parasitic power loss detection.

It will be appreciated that other parameters, such as the transmit power estimate, may evaluated and discarded if the comparison to expected values does not meet a given similarity criterion. As an example, the parasitic power loss estimate may be calculated, and if this is too high both the receive power estimate and the transmit power estimate may be excluded from being considered in the adaptation.

In many embodiments, the power receiver 105 may accordingly during a relatively short initial time interval following the entering into the power transfer mode proceed to transmit a plurality of receive power estimates to the power transmitter 101. The power transmitter 101 may then adapt the parasitic power loss detection based on the receive power estimates received from the power transmitter 101 (and typically based on the corresponding transmit power estimates).

In some embodiments, the receive power estimates may be provided for different loads of the power receiver 105. Thus, the receive power estimates may provide a plurality of data points that can be used to adapt the parasitic power loss detection for different operation points. Furthermore, the calibration unit 213 may in such scenarios be arranged to adapt a plurality of parameters of the parasitic power loss detection in response to the plurality of receive power estimates at different loads.

Specifically, the calibration unit 213 may be arranged to adapt both a calibration offset and a calibration scale factor for at least one of a transmitter power estimate, a receive power estimate, and the detection threshold in response to the plurality of receive power estimate indications. Thus, specifically, based on a nominal value (e.g. the calculated transmit power estimate, the received receive power estimate, or a nominal detection threshold for a given power level), the adaptation may introduce compensation given as:

$$X_{Comp} = X_{Comp} \cdot \alpha + \beta$$

where X represents the parameter and a represents the calibration scale factor and β is the calibration offset.

The calibration unit 213 may thus adapt both the offset and the slope resulting in an improved adaptation.

Specifically, the power receiver 105 may communicate one receive power estimate at low load and one receive power estimate at high load. This may provide improved adaptation and may in particular facilitate the determination of the offset and scale factors.

During the power transfer phase, the power transferred to the power receiver 105 is inherently dependent on the load 205 of the power receiver 105. Accordingly, it may not be possible to freely adjust the power extracted by the power receiver 105 from the power transfer signal.

However, when the power transfer phase is first entered, the power receiver 105 has initially not connected the load 205, i.e. no or very little power is initially transferred to the load 205. Accordingly, the power receiver 105 may generate a receive power estimate which reflects the estimated power extracted from the power transfer signal by the power receiver 105 prior to the powering of the load 205, and specifically prior to the load 205 being connected to the power receiver 105 and being fed power. This low load receive power estimate accordingly may correspond to substantially a minimum loading of the power transfer signal, i.e. to a minimum receive power estimate.

Upon entering the power transfer phase, the power receiver 105 will quickly connect the load 205 and start to power this up. After a short time, typically in the order of a few seconds, the load 205 may be fully powered. At this time, the power receiver 105 may generate a new receive power estimate. This receive power estimate will reflect a high load of the power receiver 105 and by communicating this high load receive power estimate to the power transmitter 101, the power transmitter 101 will be provided with both a high load receive power estimate and a low load receive power estimate.

Indeed, in many scenarios, the high load receive power estimate will tend to be a maximum for the power transfer operation. For example, in many scenarios, the power receiver 105 may be used to power an external load in the form of a battery, e.g. the power receiver 105 may be used as a battery charger. The battery will typically be at the most discharged state at the initialization of the charging, and thus will draw the highest amount of current at this stage. Accordingly, the received power will be maximum just after the powering up at the start of the power transfer phase and will reduce after that.

In this approach, the power transmitter 101 is thus provided with (at least) one low (or minimum) load receive power estimate and one high (or maximum) receive power estimate. The calibration unit 213 may in response proceed to modify the calculation of the transmit power estimate, the receive power estimate or the detection threshold used in the foreign object detection. For example, it may determine the calibration values a and (3 such that the parasitic power loss estimate for both the high load and the low load is zero.

In the following, a specific example of an approach for adaption/calibration will be described. In the example, the power transmitter 101 has just left the test mode with the foreign object detection indicating that no foreign object is present, and is entering the power transfer phase. Similarly, the foreign object detection result has been communicated to the power receiver 105 which accordingly has also moved to the power transfer phase.

The power transmitter 101 and power receiver 105 may now perform the following steps:

1. Light Load Evaluation a. The power receiver 105 estimates the received power at light load $PRx_{min}$ and communicates this to the power transmitter 1091.

b. The power transmitter receives the receive power estimate $PRx_{min}$, and compares it to the estimated transmit power $PTx_{min}$.

c. If the comparison indicates that the receive power estimate $PRx_{min}$ is not within an expected range relative to the transmit power estimate, this result is communicated to the power receiver 105 by transmitting a NACK message. The system then returns to step 1a.

d. If the comparison indicates that the receive power estimate $PRx_{min}$ is within an expected range relative to the transmit power estimate, this result is communicated to the power receiver 105 by transmitting an ACK message. The system then returns to a full load evaluation 2. Full Load Evaluation a. The power receiver 105 estimates the received power at full load $PRx_{max}$ and communicates this to the power transmitter 101.

b. The power transmitter 101 receives the receive power estimate $PRx_{max}$, and compares it to the corresponding transmitted power estimate $PTx_{max}$ c. If the comparison indicates that the receive power estimate $PRx_{max}$ is not within an expected range relative to the transmit power estimate $PTx_{max}$, this result is communicated to the power receiver 105 by transmitting a NACK message. The system then returns to step 2a.

d. If the comparison indicates that the receive power estimate $PRx_{max}$ is within an expected range relative to the transmit power estimate $PTx_{max}$, this result is communicated to the power receiver 105 by transmitting an ACK message. The system then proceeds to a calibration.

3. Calibration a. The calibration unit 213 proceeds to determine compensations for the foreign object detection based on the high and low load receive power estimates and transmit power estimates.

In addition to the above protocol, the power transmitter monitors if a dangerous situation could occur, e.g. when at full load calibration, the difference between transmitted and received power would be very large, which would be an indication that a significant amount of power is absorbed by parasitic metal. In that case the power transmitter may remove the power signal.

In addition to the above, the power receiver may in response to receiving a NACK message, indicating that the parasitic power loss estimates are outside the range, decide to exit the power transfer phase/mode e.g. to re-initialize a test-mode. The power receiver 105 may indicate to the power transmitter 101 which mode to operate in by including a mode indication in the data packets containing the receive power estimate.

It will also be appreciated that different approaches for calibrating based on the received high and low load power estimates may be used. For example, the following specific approaches may be used:

Calibration Method 1—Calibrating the Calculation of Transmit Power Estimate Used for the Foreign Object Detection.

The power transmitter 101 may calibrate the parasitic power loss estimation by calculating a new modified or calibrated transmit power estimate (P'Tx) from the original estimated transmitted power (PTx) and the received receive power estimates.

The following equation may e.g. by used:

$$P'Tx = \alpha \cdot PTx + \beta$$

where the calibration/compensation values are determined as:

$$\alpha = (PRx_{max} - PRx_{min})/(PTx_{max} - PTx_{min})$$

$$\beta = PRx_{min} - \alpha \cdot PTx_{min} \text{ or } \beta = PRx_{max} - \alpha \cdot PTx_{max}$$

Thus, the $\alpha$ value may provide a scale factor/proportional adaptation and the $\beta$ value may provide an offset adaptation.

In some embodiments/scenarios the values $PTx_{min}$ and $PRx_{min}$ will typically be close to zero, and accordingly a simpler proportional adaption may be used:

$$PTx' = PTx \cdot PRx_{max}/PTx_{rmax}$$

Calibration Method 2—Calibrating the Calculation of Receive Power Estimate Used for the Foreign Object Detection.

The power transmitter 101 may calibrate the parasitic power loss estimation by calculating a new modified or calibrated receive power estimate (P'Rx) from the original estimated receive power (PRx) and the generated transmit power estimates.

The following equation may e.g. by used:

$$P'Rx = \alpha \cdot PRx + \beta$$

where the calibration/compensation values are determined as:

$$\alpha = (PTx_{max} - PTx_{min})/(PRx_{max} - PRx_{min})$$

$$\beta = PTx_{min} - \alpha \cdot PRx_{min} \text{ or } \beta = PTx_{max} - \alpha \cdot PRx_{max}$$

Thus, the $\alpha$ value may provide a scale factor/proportional adaptation and the $\beta$ value may provide an offset adaptation.

In some embodiments/scenarios the values $PTx_{min}$ and $PRx_{min}$ will typically be close to zero, and accordingly a simpler proportional adaption may be used:

$$PRx' = PRx \cdot PTx_{max}/PRx_{rmax}$$

As mentioned previously, the foreign object detection may be based on the power receiver 105 being set to have a fixed predetermined load with the foreign object detector 209 being arranged to perform the foreign object detection based on the loading of the wireless inductive power signal.

The loading may specifically be determined by evaluating the power provided to an output circuit of the power transmitter where the output circuit comprises the power transmit inductor 103. The output circuit may specifically be the transmit inductor 103. However, in many embodiments, the output circuit may be a tuned circuit comprising the transmit inductor 103.

Indeed, in some embodiments, the foreign object detection may simply be based on the power provided to the transmit inductor. For example, the predetermined load of the power receiver 105 may simply correspond to the load being disconnected from the power receiver 105. In this example, the power provided to the transmit inductor 103 may be measured by the power transmitter 101, and if the power is higher than a given threshold, it may be determined that a foreign object is present and otherwise that no foreign object is present. The foreign object detection estimate may in such an embodiment be a binary indication of whether a foreign object is considered to be present or not, or may e.g. correspond directly to the determined power. In the latter example, the power receiver 105 may for example compare the determined power level to a threshold calculated based on an estimated power receiver load.

As a slightly more complex example, the power receiver may enter the test mode wherein pre-defined conditions are applied, and specifically with the power receiver having disconnected its target load, and instead optionally being connected to an accurate pre-defined load, e.g. consisting of an accurate resistor.

The power receiver can now more accurately determine the power consumption in this load since it is sufficient to e.g. only measure the voltage and without requiring the current through the load to be measured. In addition, the power receiver can set the voltage over the load to a predefined level. This results in a predefined current through the load and also in a predefined current through the rectifier and the receiver coil. This allows for a more accurate determination of the power loss in the receiver coil and the rectifier. Accordingly, for the predefined load condition, the power receiver 105 can more accurately determine the received power and therefore the foreign object detector 209 can calculate the power difference between transmitted power and received power more accurately.

In some embodiments, the power receiver 105 may thus set a power loading of the wireless power transfer signal to a predetermined level, such as specifically a minimum loading corresponding to the load being disconnected. The foreign object detection may then be based on an indication of the power loading of the wireless inductive power signal, e.g. measured by the power provided through the output circuit or specifically the transmit inductor.

In many embodiments, an accurate foreign object detection may be performed based on an impedance indication for an impedance of the output circuit of the power transmitter. Due to the output circuit comprising the transmit inductor 103, the impedance of the output circuit depends on the loading of the magnetic field generated by the transmit inductor 103, i.e. the impedance of the output circuit depends on the loading of the wireless inductive power signal.

The inventors have realized that the impedance of the output circuit may provide a particularly efficient and accurate foreign object detection in many embodiments.

The approach may specifically be arranged to detect presence of foreign metal object near the magnetic field of the power transmitter 101, i.e. affecting the wireless inductive power signal. Indeed, the deviation of impedance from a reference impedance has been found to be an accurate indication of metal object near the magnetic field.

Thus, in some embodiments, the foreign object detector 209 is arranged to determine the impedance of the output circuit of the power transmitter 101 and to compare this to a reference impedance. If the difference is above a given threshold, a foreign object is considered to be detected.

In some embodiments, the reference impedance and/or the decision thresholds and/or the determination of the measured impedance may be adapted. Specifically, the adaptation may occur during the initial window of the power transfer mode operation as previously described.

In many embodiments, the impedance may be determined at resonance for a tuned circuit including the transmit coil 103. Specifically, the current may be measured at resonance for the inverter being operated in predefined conditions.

In some embodiments, the output circuit may comprise a resonance/tuned circuit comprising the power transmitter inductor 103, and the power transmitter may be arranged to generate a drive signal for the output circuit at a resonance frequency of the resonance/tuned circuit.

In more detail, the power receiver 105 may enter the test mode and may operate at pre-defined conditions. Specifically, the power receiver may disconnect its target load. The only remaining load will typically be that of a microcontroller connected for communicating information to the power transmitter 101. The load is therefore very small. In this example, the received power will accordingly only depend on the power consumption of the microcontroller and the absorption of power in metal parts belonging to the appliance of the power receiver 105.

The power transmitter 101 may generate a relatively low power signal as otherwise there may be a risk that voltages at the power receiver 105 may become too high, and may cause damage the electronics in the power receiver 105, or trigger a protection circuit, (such as a Zener diode limiting a voltage). The protection circuit will cause an undesired load for the accurate measurements.

However, with a low power signal, the power absorption in a foreign metal object will also be low and this may render a foreign object detection based on estimated or measured power differences between transmitted power and received power relatively unreliable. Instead, the power transmitter 101 may measure the impedance at the transmitter inductor 103, or at the input of the resonance circuit, to determine whether a foreign metal object is present or not. It can specifically compare the measured impedance parameters to reference parameters. These reference parameters can have predefined values that can be modified in response to information received from the power receiver 105.

If the measured impedance parameters are in line with the expectation, (e.g. when the difference between a measured impedance and the reference impedance do not exceed a threshold), the foreign object detector 209 assumes no presence of a foreign object.

However, if the measured impedance parameters differs too much from the reference parameter, (e.g. when the difference exceeds a threshold), the foreign object detector 209 assumes that a foreign object has been detected.

In this case, it may e.g. involve the user to check whether a foreign object is indeed present or not, and/or whether the power receiver is well positioned or not. If the user indicates that no foreign object is present and the power receiver is well-enough positioned, the foreign object detector 209 may specifically adapt the detection.

This may be done by the foreign object detector 209 entering a calibration mode in which the power transmitter measures the impedance parameters and adapts the reference parameters such that the difference between each measured impedance parameter falls within a predefined range. The adaptation may be such that the parameter can be applied to detect a foreign object when the difference exceeds a threshold, but also such that the difference is small enough that it does not exceed this threshold when no foreign object is present.

After adaptation/at the end of the calibration mode, the foreign object detector 209 may store the reference impedance parameters e.g. in combination with the identifier of the power receiver 105 in order to allow dedicated calibration for individual power transmitter/power receiver pairings.

The impedance value compared to a reference may comprise an indication of at least one of:
an equivalent series resistance (ESR) of the output circuit;
a phase difference Φ between voltage and current for the output circuit;
a current of the power transmit inductor; and
an absolute impedance |Z| of the output circuit.

These parameters have been found to provide good indications of the presence of a foreign object, and especially have been found to demonstrate a high variation as a function of whether a foreign object is present or not.

FIG. 7 illustrates an example wherein the driver 201 drives an output circuit in the form of the transmit coil 105 and a series capacitor 701 with a foreign object 703 being potentially close.

Figure 8:
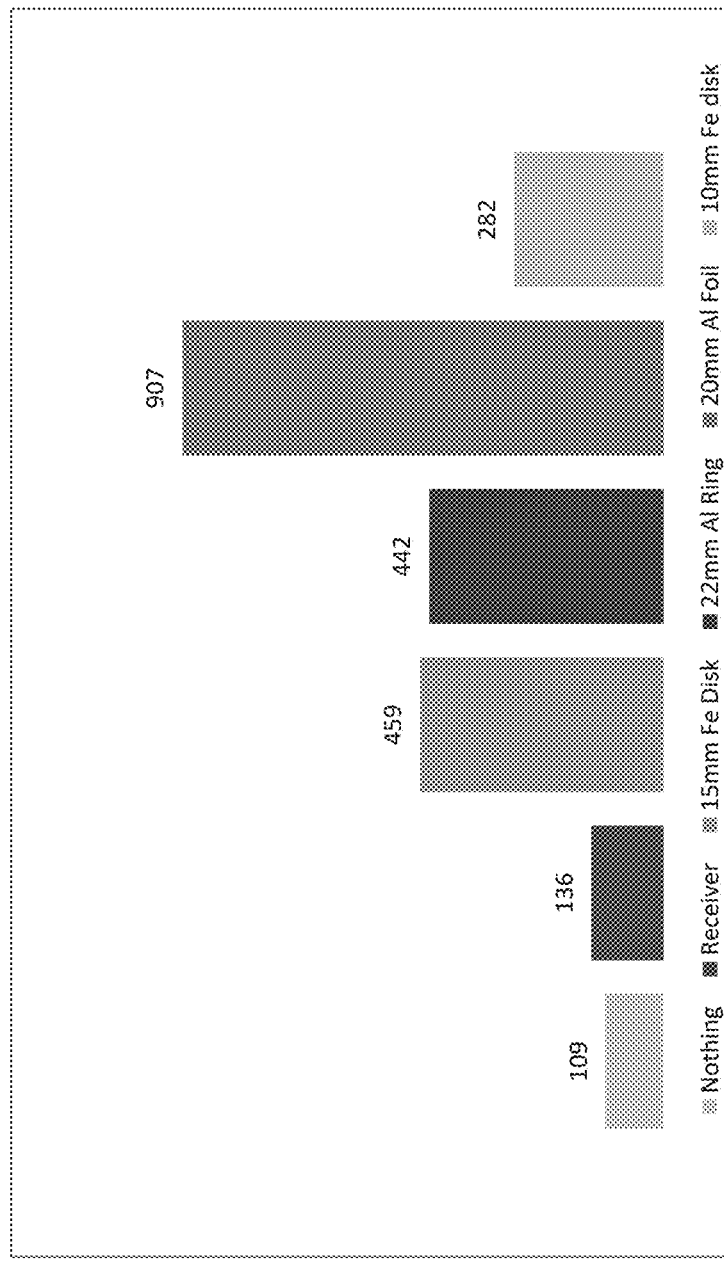
FIG. 8 illustrates an example of measured electrical series resistances for an output circuit of a power transmitter for different foreign objects being present.

FIG. 8 illustrates examples of a measured ESR (Equivalent Series Resistance) value for different foreign objects in the vicinity. The measured values are in mOhms.

The first bar shows the ESR value in case nothing is placed near the transmitter coil.
The second bar shows the ESR value in case a power receiver with no load is placed on the transmitter coil.
The third bar shows the ESR value in case a power receiver with no load is placed on the transmitter coil in combination with a 15 mm steel Disk.
The fourth bar shows the ESR value in case a power receiver with no load is placed on the transmitter coil in combination with a 22 mm Aluminum Ring.
The fifth bar shows the ESR value in case a power receiver with no load is placed on the transmitter coil in combination with a 20 mm Aluminum Foil.
The sixth bar shows the ESR value in case a power receiver with no load is placed on the transmitter coil in combination with a 10 mm steel disk.

As can clearly be seen, the measured ESR values differ substantially and allow the foreign objects to be detected based on a measurement of the ESR. Specifically, the measured ESR value is significantly higher when a foreign object is present than when no foreign object is present. The foreign object detector 209 can compare the measured ESR to a reference ESR (for example of 136 mOhm) and perform the detection in response.

Instead of the ESR value, the absolute impedance |Z| value may e.g. be used. For that purpose, it is of special interest to apply a frequency at which the power transmitter circuit resonates and the phase between voltage and current is zero. In that situation, the reactive part of the impedance will be zero and the absolute impedance |Z| will be the same as the ESR.

Figure 9:
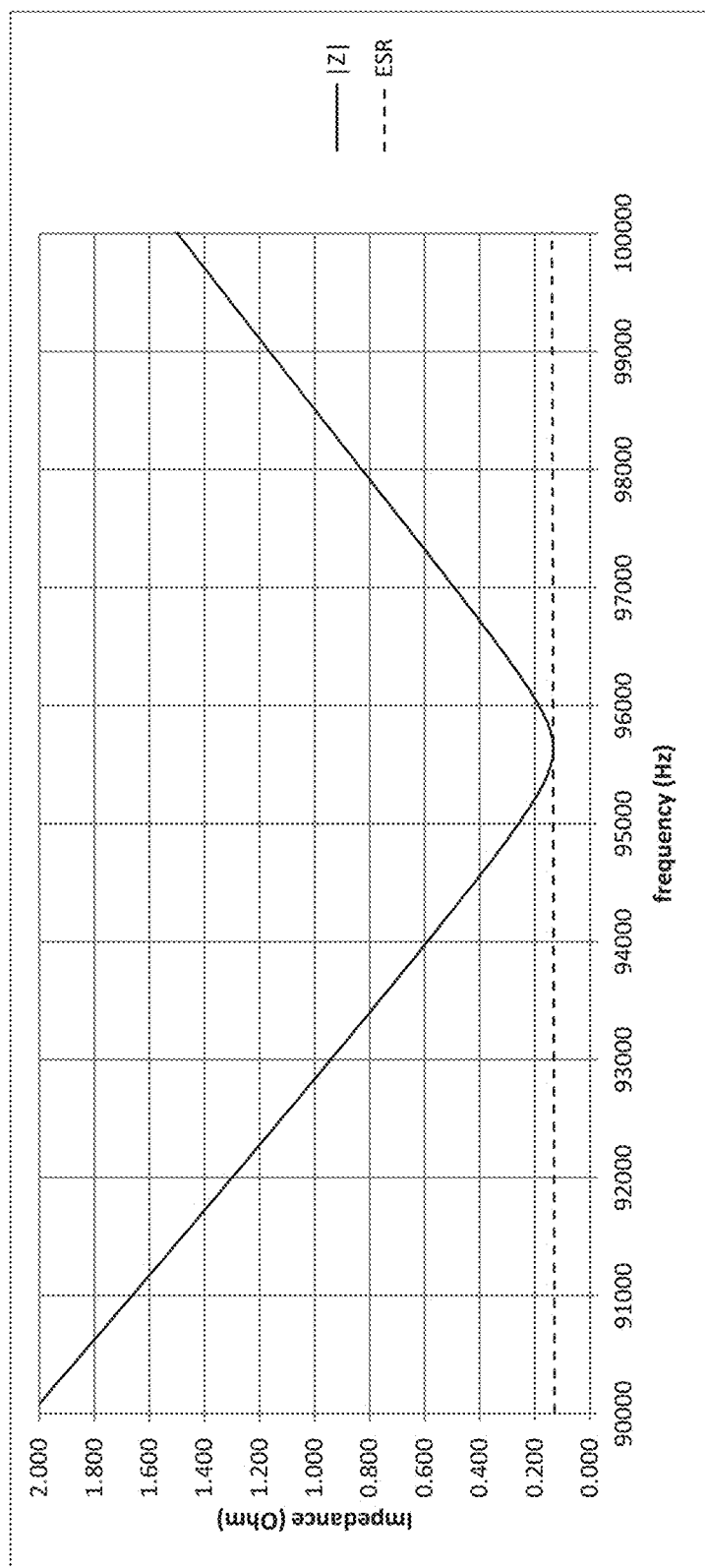
FIG. 9 illustrates an example of measured absolute impedances of an output circuit of a power transmitter.

FIG. 9 illustrates an example of |Z| and ESR values in the frequency range between 90 kHz and 100 kHz when a power receiver with no load is positioned on a power transmitter. At the frequency at which |Z| reaches the minimum value, it is equal to the ESR value.

In some embodiments, the power transmitter may measure the current through the coil while the power transmitter provides a reference AC voltage to the resonance circuit. With the same AC voltage, the measured current, I, through the coil will provide an indication of the presence of an object, since |V|=*|Z|. If the ESR value is low, the current will be high when the circuit is at resonance since the current in the resonance circuit will not be damped. If the ESR value is high, the current will be low at resonance since the current in the resonance circuit will be damped.

Figure 10:
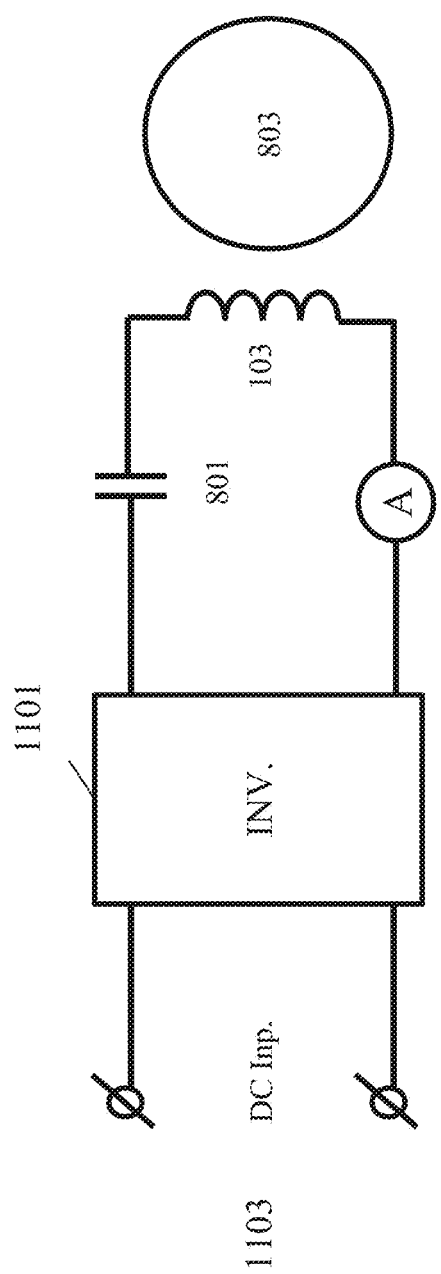
FIG. 10 illustrates an example of elements of a power transmitter in accordance with some embodiments of the invention.

A practical solution for implementation in a transmitter product is illustrated in FIG. 10 where an inverter 1101 (half bridge or full bridge) is connected to a DC input 1103 and provides power to the resonance circuit formed by the transmitter inductor 103 and series capacitance 801.

Figure 11:
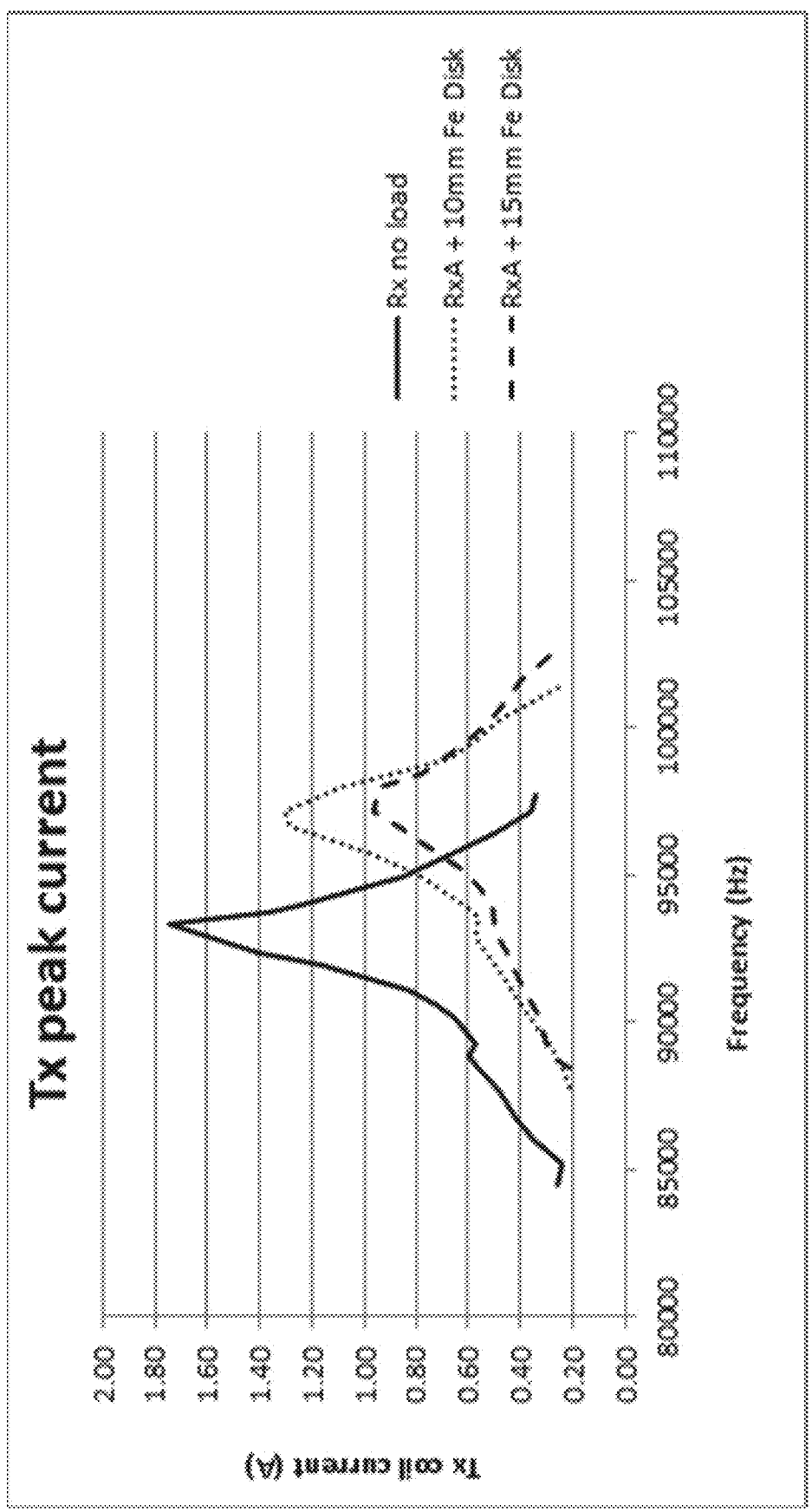
FIG. 11 illustrates an example of peak currents for an output circuit of a power transmitter for different foreign objects being present.

FIG. 11 shows peak current measurements on the transmitter coil 105 of FIG. 10 with the rail voltage and duty cycle kept constant. As can be seen, even a 10 mm Fe Disk has significant current reduction compared to the reference situation (Rx no load) and can be detected by the power receiver 105.

In some embodiments, the power transmitter 101 may comprise functionality for adjusting the frequency of the signal being applied to the resonance circuit. Specifically, the power transmitter 101 may adapt the frequency to be at the resonance frequency of the resonance circuit. For example, the power transmitter 101 may be arranged to vary the drive frequency for the drive signal to the transmitter coil 103/resonance circuit and select a drive frequency corresponding to an extreme value of a current through the transmitter coil 103, and specifically to a maximum current. Thus, in some embodiments, the power transmitter 101 may vary the frequency over a frequency range, and may set a drive frequency for the drive signal to correspond to a maximum inductor current of the transmitter coil 103. This frequency is then applied during the foreign object detection, and specifically the impedance of the resonance circuit is determined for this frequency.

Thus, the power transmitter 101 may vary the frequency until the current through the transmitter inductor 103 is maximized. It may then measure (e.g.) the equivalent series resistance (ESR) of the output circuit; the phase difference Φ between voltage and current for the output circuit; the current of the power transmit inductor; and/or the absolute impedance |Z| of the output circuit for this frequency. The foreign object detector 209 may then be performed based on the measured value.

The power transmitter may in order to find the resonance frequency for example during the ping phase sweep the frequency until the current through the transmitter coil 103 is at a maximum. For example, the power transmitter 101 may change the frequency for a normal ping signal. For example, the ping signal may initially be at e.g. 175 kHz while the resonance frequency is at 100 kHz. The power transmitter 101 then gradually reduces the frequency until the current is maximized and thus the ping signal is at the resonance frequency of 100 kHz. The reduction is preferably fast such as typically within a few seconds.

However, an issue with such an approach is that it may result in a potentially large current at the resonance frequency. This may result in a strong magnetic signal which may induce a high voltage in the receive coil 107.

However, in some embodiments, where the power transmitter 101 is arranged to vary a frequency of the drive signal for the transmitter coil 103 over a range comprising the resonance frequency of the resonance circuit comprising the transmitter coil 103, the power transmitter 101 may also comprise a power controller arranged to adapt at least one of a voltage amplitude and a duty cycle of the drive signal in response to a current of the transmitter coil 103.

The power controller may specifically reduce the amplitude and/or duty cycle for increasing current, and specifically may reduce the amplitude and/or duty cycle if the current of the transmitter coil 103 exceeds a threshold.

Thus, the power transmitter 101 may include a current control which may prevent that the induced voltage at the power receiver exceeds an allowed maximum. Specifically the power transmitter 101 may e.g. change the frequency in small steps from being out of resonance towards resonance. Since this will increase the current in the transmitter coil 103 and accordingly the induced voltage at the power receiver, the power transmitter 101 may reduce the rail voltage and/or the duty cycle to compensate for this increase. Thus, while moving the drive frequency towards the resonance frequency, the power transmitter 101 can measure the current of the transmitter coil 103 and control the rail voltage and/or the duty cycle of the inverter such that it keeps the current constant within a certain allowed margin.

In some embodiments, the control of the voltage amplitude and/or duty cycle may further be in response to the frequency of the drive signal. Indeed, the induced voltage may be dependent on the current in the transmitter coil 103 but may also be dependent on the frequency itself due to the receive coil 107 being part of resonance circuit of the power receiver 105. Indeed, for higher frequencies, the induced voltage will be higher for the same current. This may be reflected in the control of the amplitude and/or duty cycle, e.g by controlling the amplitude and/or duty cycle such that it keeps the product of the current and frequency constant within a certain allowed margin, e.g. −50% and +100%. Thus, in some embodiments, the power controller may be arranged to control the amplitude and/or duty cycle tom maintain a product of a current and frequency of a drive signal for the transmitter coil 103 to be within a predetermined range.

Once the power transmitter 101 has reached the resonance frequency, it may measure e.g. the ESR value, the coil current, coil voltage etc. and compare these values to expected values derived from the power receiver 103.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A wireless power transmitter comprising:
    a transmit power inductor circuit, wherein the transmit power inductor circuit is configured to generate a wireless inductive power signal;
    a first detector circuit,
        wherein the first detector circuit is configured to generate a foreign object estimate when the wireless power receiver is operating in a test mode,
        wherein a loading of the wireless inductive power signal by a wireless power receiver when operating in the test mode is constrained relative to the loading of the wireless inductive power signal by the wireless power receiver when operating in a power transfer mode during a power transfer phase;
    a controller circuit, wherein the controller circuit is configured to enter at least one of: the wireless power transmitter, and a wireless power receiver, into a power transfer mode, when the foreign object detection estimate indicates that no foreign object is present;
    a second detector circuit wherein the second detector circuit is configured to, when in the power transfer mode, generate a parasitic power loss detection for the power transfer in response to a parasitic power loss estimate exceeding a threshold; and
    a calibration circuit, wherein the calibration circuit is configured to initialize adjusting a first parameter of the parasitic power loss detection in response to operating parameter values for the power transfer phase during an initial time interval of entering the power transfer phase following the foreign object detection estimate indicating that no foreign object is present and to terminate adjusting the first parameter while remaining in the power transfer phase.

2. The wireless power transmitter of claim 1, further comprising a communicator circuit,
    wherein the communicator circuit is configured to transmit a test mode request to the wireless power receiver,
    wherein the test mode request requests that the wireless power receiver enter the test mode,
    wherein the loading of the wireless inductive power signal by the wireless power receiver is constrained relative to the loading of the wireless inductive power signal by the wireless power receiver when operating in the power transfer mode during the power transfer phase.

3. The wireless power transmitter of claim 1, further comprising a communicator circuit,
    wherein the communicator circuit is configured to receive a test mode initiation message from the wireless power receiver,
    wherein the test mode initiation message requests that the wireless power receiver entered the test mode,
    wherein the loading of the wireless inductive power signal by the wireless power receiver is constrained relative to the loading of the wireless inductive power signal by the wireless power receiver when operating in the power transfer mode during the power transfer phase,
    wherein the foreign object detector is configured to perform the foreign object detection in response to receiving the test mode initiation message.

4. The wireless power transmitter of claim 1,
    wherein the operating parameter values comprise at least one of: a received wireless power estimate, and a transmit wireless power estimate, wherein at least one of: a received wireless power estimate, and a transmit wireless power estimate are determined from measurements within the initial time interval.

5. The wireless power transmitter of claim 1, wherein the wireless power transmitter is configured to transmit at least one foreign object detection estimate indication to the wireless power receiver.

6. The wireless power transmitter of claim 1, wherein the first parameter is at least one of: a parasitic wireless power loss estimate calculation parameter, and the threshold.

7. The wireless power transmitter of claim 1,
    wherein the transmit power inductor circuit comprises a transmitter coil,
    wherein the wireless power transmitter is configured to adjust a frequency of a drive signal for the transmitter coil over a range comprising a resonance frequency of a resonance circuit comprising the transmitter coil,
    wherein the wireless power transmitter comprises a power controller configured to adjust at least one of: a voltage amplitude, and a duty cycle of the drive signal, to restrict at least one of: a current of the transmitter coil, and a product of a frequency of the drive signal and a current of the transmitter coil within a range.

8. The wireless power transmitter of claim 1, wherein the first measured load comprises a power load indication for an output circuit of the wireless power transmitter, the output circuit comprises the power transmit inductor.

9. A wireless power transfer system comprising:
a wireless power transmitter circuit,
  wherein the wireless power transmitter circuit comprises a transmit power inductor,
  wherein the transmit powered inductor is configured to generate the wireless inductive power signal;
a wireless power receiver circuit,
  wherein the wireless power receiver circuit configured to operate in at least a test mode or a power transfer mode,
  wherein a loading of the wireless inductive power signal by the wireless power receiver when operating in the test mode is constrained relative to the loading of the wireless inductive power signal by the wireless power receiver when operating in the power transfer mode during a power transfer phase;
a first detector circuit, wherein the first detector circuit is configured to generate, a foreign object detection estimate when the wireless power receiver is operating in the test mode;
a controller circuit, wherein the controller circuit is configured to enter at least one of: the wireless power transmitter, and the wireless power receiver, into a power transfer mode when the foreign object detection estimate indicates that no detection foreign object is present;
a second detector circuit, wherein the second detector circuit configured to, when in a power transfer mode, generate a parasitic power loss detection for the power transfer in response to a parasitic power loss estimate exceeding a threshold; and
a calibration circuit, wherein the calibration circuit configured to initialize adjusting a first parameter of the parasitic power loss detection in response to operating parameter values for the power transfer phase during an initial time interval of entering the power transfer phase following the foreign object detection estimate indicating that no foreign object is present, and to terminate adjusting the first parameter while remaining in the power transfer phase.

10. The wireless power transfer system of claim 9,
wherein the wireless power receiver is configured to transmit a test mode initiation command to the wireless power transmitter,
wherein the power transmitter is configured to enter the test mode in response to receiving the test mode initiation command.

11. The wireless power transfer system of claim 9,
wherein the wireless power receiver is configured to transmit a test mode termination command to the wireless power transmitter,
wherein the wireless power transmitter is configured to enter the power transfer mode in response to receiving the test mode termination command.

12. The wireless power transfer system of claim 9, wherein the wireless power transmitter is configured to transmit a foreign object detection estimate indication to the wireless power receiver when in the test mode, and the wireless power receiver is configured to exit the test mode in response to receiving a foreign object detection estimate indication indicating that no foreign object is present and to remain in the test mode in response to receiving a foreign object detection estimate indication indicating that a foreign object is present.

13. A wireless power receiver comprising:
a first detector circuit configured to generate, a foreign object detection estimate when the wireless power receiver is operating in the test mode;
a controller circuit configured to enter at least one of: a wireless power transmitter, and the wireless power receiver, into a power transfer mode when the foreign object detection estimate indicates that no foreign object is present;
a second detector circuit configured to, when in the power transfer mode, generate a parasitic power loss detection for the power transfer in response to a parasitic power loss estimate exceeding a threshold; and
a calibration circuit configured to initialize adjusting a first parameter of the parasitic power loss detection in response to operating parameter values for the power transfer phase during an initial time interval of entering the power transfer phase following the foreign object detection estimate indicating that no foreign object is present and to terminate adjusting the first parameter while remaining in the power transfer phase.

14. A method of operating a wireless power receiver, the method comprising:
generating by a first detector circuit, a foreign object detection estimate when the wireless power receiver is operating in a test mode;
wherein a loading of the wireless inductive power signal by the wireless power receiver when operating in the test mode is constrained relative to the loading of the wireless inductive power signal by the wireless power receiver when operating in a power transfer mode during a power transfer phase;
entering by a controller circuit, at least one of: a wireless power transmitter, and the wireless power receiver, into a power transfer mode when the foreign object detection estimate indicates that no foreign object is detected;
generating by a second detector circuit, a parasitic power loss detection for the power transfer in response to a parasitic power loss estimate exceeding a threshold when in the power transfer mode;
initializing by a calibration circuit;
adjusting a first parameter of the parasitic power loss detection in response to operating parameter values for the power transfer phase during an initial time interval of entering the power transfer phase following the foreign object detection estimate indicating that no foreign object is present; and
terminating the adjusting of the first parameter while remaining in the power transfer phase.

15. A method operating a wireless power transmitter, the method comprising:
generating by a transmit power inductor circuit a wireless inductive power signal;
generating by a first detector circuit, a foreign object detection estimate when a wireless power receiver is operating in a test mode;
wherein a loading of the wireless inductive power signal by the wireless power receiver when operating in the test mode is constrained relative to the loading of the wireless inductive power signal by the wireless power receiver when operating in a power transfer mode during a power transfer phase;
entering by a controller circuit, at least one of: the wireless power transmitter, and a wireless power receiver circuit, into a power transfer mode when the foreign object detection estimate indicates that no foreign object is present;

generating by a second detector circuit, a parasitic power loss detection for the power transfer in response to a parasitic power loss estimate being outside a range when in the power transfer mode;

initializing by a calibration circuit;

adjusting a first parameter of the parasitic power loss detection in response to operating parameter values for the power transfer phase during an initial time interval of entering the power transfer phase following the foreign object detection estimate indicating that no foreign object is present; and terminating the adjusting of the first parameter while remaining in the power transfer phase.

16. A computer program stored on a non-transitory medium, wherein the computer program when executed on processor performs the method as claimed in claim 14.

17. A computer program stored on a non-transitory medium, wherein the computer program when executed on processor performs the method as claimed in claim 15.

* * * * *